(12) United States Patent  
Watanabe et al.

(10) Patent No.: US 11,724,715 B2  
(45) Date of Patent: Aug. 15, 2023

(54) VEHICLE CONTROL SYSTEM

(71) Applicant: Toyota Jidosha Kabushiki Kaisha, Toyota (JP)

(72) Inventors: Yoshinori Watanabe, Gotemba (JP); Kazuyuki Fujita, Gotemba (JP); Takayuki Goto, Yokohama (JP); Masahiro Harada, Hadano (JP); Nobuhide Kamata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 120 days.

(21) Appl. No.: 17/069,213

(22) Filed: Oct. 13, 2020

(65) Prior Publication Data

US 2021/0107517 A1    Apr. 15, 2021

(30) Foreign Application Priority Data

Oct. 15, 2019    (JP) ................. 2019-188902

(51) Int. Cl.
*B60W 60/00*    (2020.01)
*G01C 21/34*    (2006.01)
*B60W 30/095*   (2012.01)
*B60W 30/09*    (2012.01)

(52) U.S. Cl.
CPC .... *B60W 60/0011* (2020.02); *B60W 60/0015* (2020.02); *G01C 21/3461* (2013.01); *B60W 30/09* (2013.01); *B60W 30/0956* (2013.01)

(58) Field of Classification Search
CPC ......... B60W 60/0011; B60W 60/0015; B60W 30/09; B60W 30/0956; B60W 60/001; B60W 2554/00; B60W 10/20; B60W 30/18163; B60W 10/18; B60W 2554/80;
(Continued)

(56) References Cited

U.S. PATENT DOCUMENTS

| 9,229,453 B1 * | 1/2016 | Lee ........................ B60W 10/20 |
| 11,299,152 B2 * | 4/2022 | Ishioka ................. B60W 10/20 |
| 2017/0236422 A1 | 8/2017 | Naka et al. |

(Continued)

FOREIGN PATENT DOCUMENTS

| JP | 2016-071566 A | 5/2016 |
| JP | 2016-218996 A | 12/2016 |

(Continued)

*Primary Examiner* — Adam R Mott  
*Assistant Examiner* — Erick T. Detweiler  
(74) *Attorney, Agent, or Firm* — Dinsmore & Shohl LLP

(57) ABSTRACT

A vehicle control system generates a first target trajectory, which is a target trajectory for an automated driving of a vehicle, and executes vehicle travel control based on the first target trajectory. The vehicle control system generates a second target trajectory which is a target trajectory which does not conflict with a restrict condition, when the travel based on the first target trajectory conflicts with a safety restrict condition, and executes travel assist control by using the second target trajectory. The vehicle control system judges whether or not a resurgence condition is satisfied by using the first target trajectory that is generated during the execution of the travel assist control. If it is judged that the resurgence condition is satisfied, the vehicle control system returns to the execution of the vehicle travel control from that of the travel assist control.

10 Claims, 23 Drawing Sheets

(58) Field of Classification Search
CPC . B60W 30/095; B60W 30/10; G01C 21/3461; G05D 1/0212; G05D 1/0214
See application file for complete search history.

(56) References Cited

U.S. PATENT DOCUMENTS

| | | |
|---|---|---|
| 2018/0151074 A1 | 5/2018 | Noto et al. |
| 2019/0291727 A1* | 9/2019 | Shalev-Shwartz .... B60W 10/20 |
| 2019/0308625 A1 | 10/2019 | Iimura et al. |
| 2019/0310644 A1 | 10/2019 | Zhang |
| 2020/0201324 A1* | 6/2020 | Darayan .............. G05D 1/0077 |
| 2020/0331476 A1* | 10/2020 | Chen .................... G05D 1/0088 |
| 2021/0094539 A1* | 4/2021 | Beller ................. B60W 30/095 |

FOREIGN PATENT DOCUMENTS

| | | |
|---|---|---|
| JP | 2017-081425 A | 5/2017 |
| JP | 2018-086946 A | 6/2018 |

* cited by examiner

VEHICLE CONTROL SYSTEM

CROSS-REFERENCE TO RELATED APPLICATION

The present application claims priority under 35 U.S.C. § 119 to Japanese Patent Application No. 2019-188902, filed Oct. 15, 2019. The contents of this application are incorporated herein by reference in their entirety.

BACKGROUND

Technical Field

The present disclosure relates to a vehicle control system.

Background Art

JP2016-218996A discloses a vehicle driving assistance system. The prior art system executes judgement and determination processing during an execution of braking control to avoid a collision with an object which exists in front of a vehicle. In the braking control, an urgent brake is operated. The judgement processing is processing to judge whether or not to stop the operation of the urgent brake. The determination processing is processing that is executed when it is judged to stop the operation of the urgent brake. In the determination processing, a content of assist control which is executed after the operation of the urgent brake is determined according to a preset priority order. According to the prior art system, the assist control to be carried after the operation of the emergency brake is selected from the preset contents thereof.

SUMMARY

Consider "vehicle travel control" of an automated driving vehicle in which steering, acceleration and deceleration of the vehicle is controlled. In particular, consider a case where the vehicle travel is executed such that vehicle follows a target trajectory. During the execution of the automated driving, the target trajectory of the vehicle travel control is generated by an automated drive system that manages the automated driving.

Even when the target trajectory of the vehicle travel control is generated, urgent "travel assist control" may be executed due to a driving safety constraint. When the travel assist control is executed, it is expected that the vehicle is controlled to follow the target trajectory for the travel assist control. Here, it is also expected that target trajectory for the travel assist control has data other than that for the travel control.

The prior art system has not been developed to focus on both of the target trajectories for the vehicle travel control and the travel assist control. The assist control which is selected in the determination processing includes control to prompt a manual operation to a driver of the vehicle. As describe above, in the prior art system, it is difficult to automatically resurgence the vehicle travel control after the emergency brake that is carried out during the execution of the vehicle travel control. Therefore, developments based on a new aspect is desired.

It is an object of the present disclosure to provide a technique capable of automatically resurgence, from the urgent travel assist control that is executed during the vehicle travel control in which the vehicle is controlled so as to follow the target trajectory, to the vehicle travel control.

A first aspect of the present disclosure is a vehicle control system which has the following characteristics.

The vehicle control system controls a vehicle in which an automated driving is performed.

The vehicle control system comprises a control device.

The control device includes a processor and a storage device.

The storage device stores a program executable by the processor.

When the program is executed by the processor, the processor is configured to:

generate a first target trajectory that is a target trajectory for the automated driving;

execute vehicle travel control based on the first target trajectory;

during the execution of the vehicle travel control, judge whether or not a vehicle travel based on the first target trajectory conflicts with a safety restrict condition;

if it is judged that the vehicle travel based on the first target trajectory conflicts with the restrict condition, generate a second target trajectory being a target trajectory that does not conflict with the restrict condition;

execute travel assist control based on the second target trajectory instead of the execution of the vehicle travel control;

judge whether or not a resurgence condition is satisfied based on the first target trajectory that is generated during the execution of the travel assist control; and if it is judged that the resurgence condition is satisfied, return to the execution of the vehicle travel control from the execution of the travel assist control.

A second aspect of the present disclosure further has the following features in the first aspect.

When the program is executed by the processor, the processor is further configured to:

judge whether or not execution information of the travel assist control is present; and if it is judged that the execution information is present, generate as the first target trajectory a target trajectory having a travel safety level higher than the first target trajectory that is generated when it is judged that the execution information is absent.

A third aspect of the present disclosure has the following feature in the first aspect.

When the program is executed by the processor, the processor is further configured to:

tighten the restrict condition for a first preset period after it is judged that the resurgence condition is satisfied.

A fourth aspect of the present disclose has the following feature in the first aspect.

When the program is executed by the processor, the processor is further configured to:

continuously generate the second target trajectory for a second preset period after it is judged that the resurgence condition is satisfied.

A fifth aspect of the present disclosure has the following feature in the first aspect.

When the program is executed by the processor, the processor is further configured to:

for a third preset period after it is judged that the resurgence condition is satisfied, generate as the first target trajectory a target trajectory having a higher travel safety level than the first target trajectory that is generated outside the third preset period.

A sixth aspect of the present disclosure has the following features in the first aspect.

The control device includes a first control device and a second control device capable of communication with each other.

The first control device includes a first processor and a first memory device.

The first memory device stores a first program executable by the first processor.

The second control device includes a second processor and a second memory device.

The second memory device stores a second program executable by the second processor.

When the first program is executed by the first processor, the first processor is configure to:

generate a first target trajectory; and transmit the first target trajectory to the second control device.

When the second program is executed by the second processor, the second processor is configured to:

execute the vehicle travel control by using the first target trajectory that is received by the second control device;

if it is judged that the vehicle travel based on the first target trajectory conflicts with the restrict condition, generate the second target trajectory;

execute the travel assist control by using the second target trajectory;

judge whether or not a resurgence condition is satisfied based on the first target trajectory that is received by the second control device during the execution of the travel assist control; and if it is judged that the resurgence condition is satisfied, return to the execution of the vehicle travel control from the execution of the travel assist control.

A seventh aspect of the present disclosure has the following features in the sixth aspect.

When the second program is executed by the second processor, the second processor is further configured to:

if it is judged that the vehicle travel based on the first target trajectory conflicts with the restrict condition, transmit execution information of the travel assist control to the first control device.

When the first program is executed by the first processor, the first processor is further configure to:

judge whether or not the execution information received from the first control device is present; and if it is judged that the execution information is present, generate as the first target trajectory a target trajectory having a travel safety level higher than that of the first target trajectory generated when it is judged that the execution information is absent.

An eighth aspect of the present disclosure has the following feature in the sixth aspect.

When the second program is executed by the second processor, the second processor is configured to:

tighten the restrict condition for the first preset period after it is judged that the resurgence condition is satisfied.

A ninth aspect of the present disclosure has the following feature in the sixth aspect.

When the second program is executed by the second processor, the second processor is configured to:

continuously generate the second target trajectory for the second preset period after it is judged that the resurgence condition is satisfied.

A tenth aspect of the present disclosure has the following feature in the sixth aspect.

When the first program is executed by the first processor, the first processor is configured to:

for the third preset period after it is judged that the resurgence condition is satisfied, generate as the first target trajectory a target trajectory having a higher travel safety level than the first target trajectory that is generated outside the third preset period.

An eleventh aspect of the present disclosure has the following feature in the first aspect.

The resurgence condition includes a condition where a travel safety level of the first target trajectory generated during the execution of the travel assist control is greater than or equal to a predetermined safety level.

A twelfth aspect of the present disclosure has the following feature in the first aspect.

The resurgence condition includes a condition where a match level between the first target trajectory that is generated during the execution of the travel assist control and the second target trajectory is greater than or equal to a predetermined match level.

According to the first aspect, it is judged whether or not the resurgence condition is satisfied by using the first target trajectory during the execution of the travel assist control based on the second target trajectory. Since the travel assist control is executed instead of the vehicle travel control by using the first target trajectory, the travel assist control can be said as urgent control that is executed by interrupting the vehicle travel control. Here, the first target trajectory is generated not only during the execution of the vehicle travel control but also during the execution of the travel assist control. Therefore, if the resurgence condition is judged by using the first target trajectory, it is possible to realize an automatic resurgence to the vehicle travel control from the travel assist control that is urgently executed during the execution of the vehicle travel control.

According to the second aspect, if it is judged that the execution information is present, a target trajectory is generated, as the first target trajectory, having a travel safety level higher than that of the first target trajectory generated when it is judged that the execution information is absent. The presence of the execution information means that the travel assist control is being executed. Therefore, if the first target trajectory having such a higher travel safety level is generated when the execution information is present, it is possible to increase probability that the resurgence condition is satisfied. Therefore, it is possible to realize in a short time the resurgence from the execution of the travel assist control to the execution of the vehicle travel control.

According to the third aspect, the restrict condition is tightened for the first preset period after it is judged that the resurgence condition is satisfied. The fact that restrict condition is tightened means that the travel of the vehicle based on the first target trajectory is more likely to conflict with the restrict condition. Here, if it is judged that the resurgence condition is satisfied, the resurgence is performed to execute the vehicle travel control. However, a factor of the execution of the travel assist control may not be completely eliminated, and a new factor may occur. In this respect, if the restrict condition is tightened for the first preset period, it is possible to ensure driving safety after the resurgence condition is satisfied.

According to the fourth aspect, the second target trajectory is continuously generated for the second preset period after it is judged that resurgence condition is satisfied. If it is judged that the resurgence condition is satisfied, the resurgence is performed to execute the vehicle travel control. As described in the third aspect, even when the resurgence condition is satisfied, problems may still occur. In this regard, if the second target trajectory is continuously generated, it is possible to shorten the time until the execution of travel assist control is started again after it is judged that the travel of the vehicle based on the first target trajectory conflicts with the restrict condition.

According to the fifth aspect, for the third preset period after it is judged that the resurgence condition is satisfied, a target trajectory is generated as the first target trajectory having a higher travel safety level than the first target trajectory that is generated outside the third preset period. As described in the third aspect, even when the resurgence condition is satisfied, problems may still occur. In this respect, if the first target trajectory having the higher travel safety level is generated, it is more likely to be judged that the travel of the vehicle based on the first target trajectory does not conflict with the restrict condition. Therefore, it is possible to reduce processing load of the processor for generating the second target trajectory.

According to the sixth aspect, the same effect as that according to the first aspect can be obtained by the execution of the first and second programs by the first and second control devices.

According to the seventh aspect, the same effect as that according to the second aspect can be obtained by the execution of the first and second programs by the first and second control devices.

According to the eighth aspect, the same effect as that according to the third aspect can be obtained by the execution of the second program by the second control device.

According to the ninth aspect, the same effect as that according to the fourth aspect can be obtained by the execution of the second program by the second control device.

According to the tenth aspect, the same effect as that according to the fifth aspect can be obtained by the execution of the first program by the first control device.

According to the eleventh or twelfth aspect, it is possible to realize the judgement of the resurgence condition by using the first target trajectory.

DESCRIPTION OF THE EMBODIMENTS

First Embodiment

A first embodiment of the present disclosure will be described below with reference to FIGS. 1 to 15.

1. Outline

Figure 1:
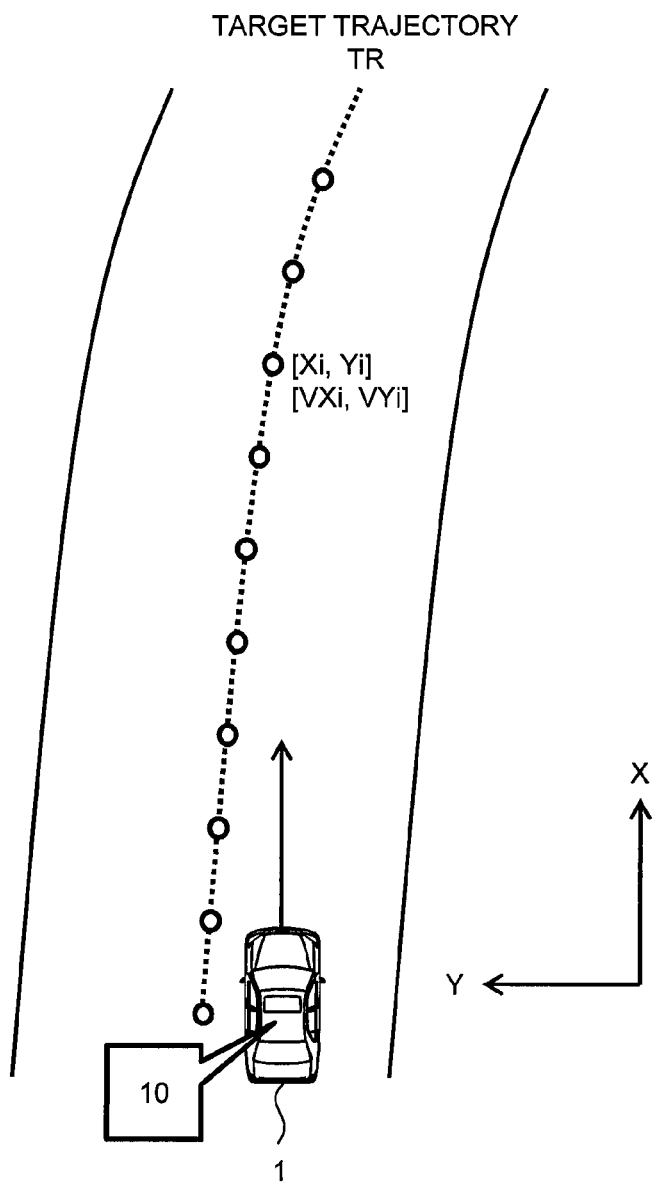
FIG. 1 is a conceptual diagram for explaining an outline of a vehicle control system according to a first embodiment.

FIG. 1 is a conceptual diagram for explaining an outline of a vehicle control system 10 according to the first embodiment. The vehicle control system 10 controls a vehicle 1. Typically, the vehicle control system 10 is installed on the vehicle 1. At least a part of the vehicle control system 10 may be placed in an external device outside the vehicle 1 and remotely control the vehicle 1. That is, the vehicle control system 10 may be distributed in the vehicle 1 and the external device.

The vehicle 1 is an automated driving vehicle capable of automated driving. The automated driving here means one where a driver does not necessarily have to 100% concentrate on driving (e.g., so-called Level 3 or more automated driving).

The vehicle control system 10 manages the automated driving of the vehicle 1. Moreover, the vehicle control system 10 executes "vehicle travel control" that controls steering, acceleration, and deceleration of the vehicle 1. In particular, during the automated driving, the vehicle control system 10 executes the vehicle travel control such that the vehicle 1 follows a target trajectory TR.

The target trajectory TR includes at least a set of target positions [Xi, Yi] of the vehicle 1 in a lane on which the vehicle 1 travels. In the example shown in FIG. 1, an X-direction is a forward direction of the vehicle 1, and a Y-direction is a plane direction orthogonal to the X-direction. However, the coordinate system (X, Y) is not limited to the example shown in FIG. 1, the target trajectory TR may further include a target velocity[VXi, VYi] for each target position[Xi, Yi]. In order to make the vehicle 1 follow such the target trajectory TR, the vehicle control system 10 calculates a deviation (e.g., a lateral deviation, a yaw angle deviation and a velocity deviation) between the vehicle 1 and the target trajectory TR, and then executes the vehicle travel control such that the deviation decreases.

Figure 2:
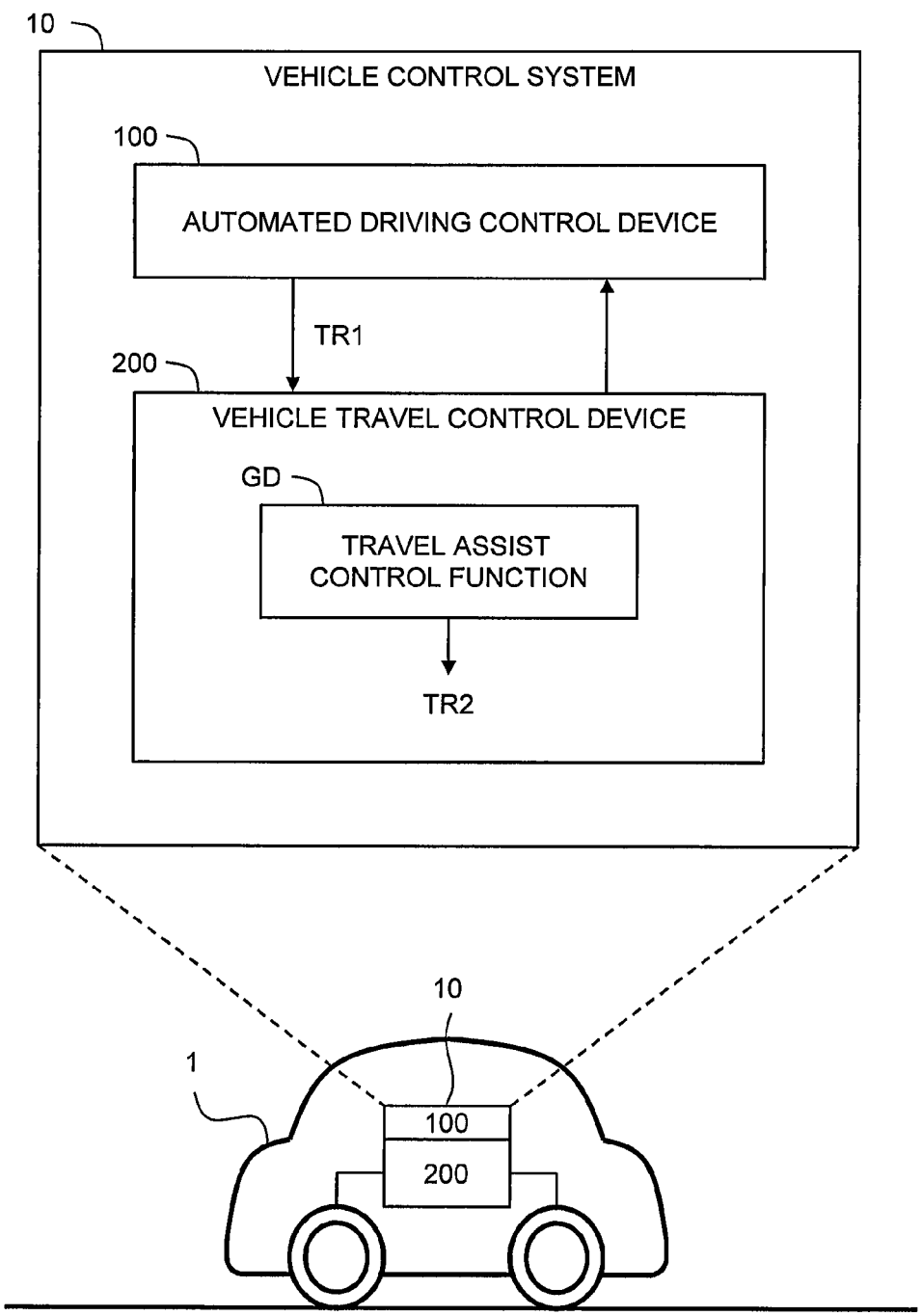
FIG. 2 is a schematic diagram showing a configuration of a vehicle control system according to the first embodiment.

FIG. 2 is a block diagram schematically showing a configuration of the vehicle control system 10 according to the first embodiment. The vehicle control system 10 includes an automated driving control device 100 and a vehicle travel control device 200. The automated driving control device 100 and the vehicle travel control device 200 may be physically-separated devices, or may be an identical device. When the automated driving control device 100 and the vehicle travel control device 200 are physically-separated devices, they exchange necessary information via communication.

The automated driving control device 100 is responsible for management of the automated driving of the vehicle 1 among the functions of the vehicle control system 10. In particular, the automated driving control device 100 generates the target trajectory TR for the automated driving of the vehicle 1. For example, the automated driving control device 100 uses a sensor to detect (recognize) a situation around the vehicle 1. Then, the automated driving control device 100 generates a travel plan of the vehicle 1 during the automated driving based on a destination and the situation around the vehicle 1. The travel plan includes maintaining a current travel lane, making a lane change, avoiding an obstacle, and so forth. The automated driving control device 100 then generates the target trajectory TR for the vehicle 1 to travel in accordance with the travel plan.

The target trajectory TR for the automated driving generated by the automated driving control device 100 is hereinafter referred to as a "first target trajectory TR1." The automated driving control device 100 outputs the generated first target trajectory TR1 to the vehicle travel control device 200.

On the other hand, the vehicle travel control device 200 is responsible for the vehicle travel control among the functions of the vehicle control system 10. That is, the vehicle travel control device 200 controls the steering, the acceleration, and the deceleration of the vehicle 1. In particular, the vehicle travel control device 200 controls the steering, the acceleration, and the deceleration of the vehicle 1 such that the vehicle 1 follows the target trajectory TR. In order to make the vehicle 1 follow the target trajectory TR, the vehicle travel control device 200 calculates a deviation (e.g., a lateral deviation, a yaw angle deviation and a velocity deviation) between the vehicle 1 and the target trajectory TR, and then executes the vehicle travel control such that the deviation decreases.

During the automated driving of the vehicle 1, the vehicle travel control device 200 receives the first target trajectory TR1 from the automated driving control device 100. Basically, the vehicle travel control device 200 executes the vehicle travel control such that the vehicle 1 follows the first target trajectory TR1.

The vehicle travel control device 200 according to the first embodiment further has a function of "travel assist control" (travel assist control function GD) that assists travel of the vehicle 1. In the travel assist control, at least one of steering, acceleration, and deceleration of vehicle 1 is controlled in order to improve the driving safety of the vehicle 1. The travel assist control includes collision avoidance control and lane departure suppression control. The collision avoidance control assists avoidance of a collision between the vehicle 1 and a surrounding object (namely, an avoidance target). The lane departure suppression control suppresses the vehicle 1 from departing from a travel lane.

The vehicle travel control device 200 uses sensors to detect a situation around the vehicle 1 and a state of the vehicle 1. Then, the vehicle travel control device 200 judges whether or not the travel assist control needs to be executed based on detected result of the sensors. In other words, the vehicle travel control device 200 judges whether or not the travel of the vehicle 1 based on the first target trajectory TR1 conflicts with the "restrict condition" on the driving safety. If it is judged that the travel of the vehicle 1 based on the first target trajectory TR1 conflicts with the restrict condition, the vehicle travel control device 200 generates a target trajectory TR for travel assist control.

The target trajectory TR for the travel assist control is a target trajectory TR that does not conflict with restrict condition. The target trajectory TR that does not conflict with the restrict condition is hereinafter referred to as a "second target trajectory TR2". The second target trajectory TR2 is generated by modifying the first target trajectory TR1. The second target trajectory TR2 may be generated independently. That is, the second target trajectory TR2 may be generated without using the first target trajectory TR1.

If the second target trajectory TR2 is generated, the vehicle travel control device 200 determines the second target trajectory TR2 as a final target trajectory TR. That is, when the second target trajectory TR2 is generated, the vehicle travel control device 200 adopts it as the final target trajectory TR. The vehicle travel control device 200 then executes the travel assist control such that the vehicle 1 follows the second target trajectory TR2.

Figure 3:
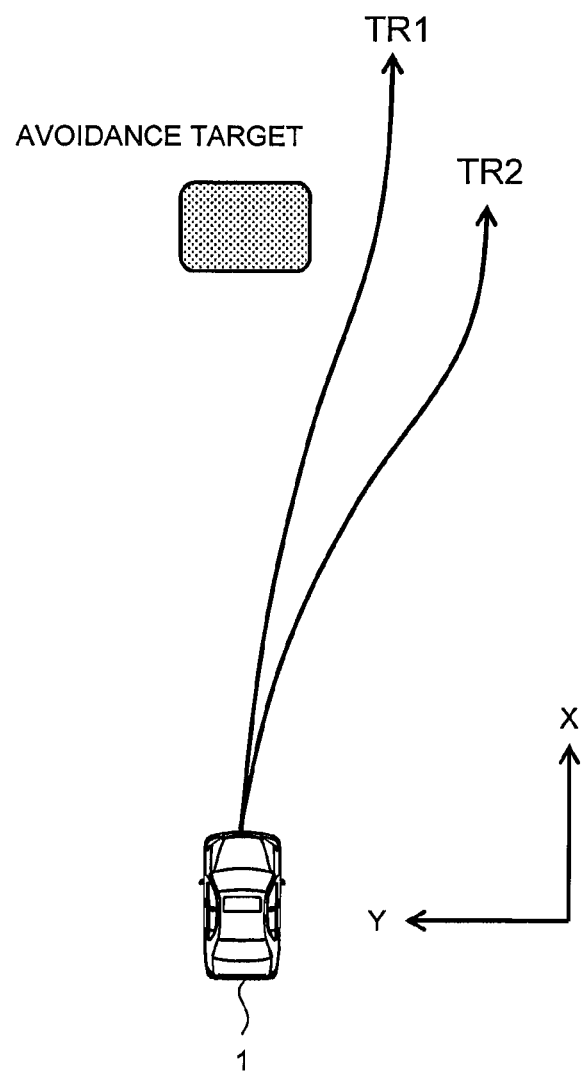
FIG. 3 is a conceptual diagram illustrating an example of travel assist control according to the first embodiment.

As an example, FIG. 3 shows a situation in which the avoidance target such as a walker or an obstacle is present in front of the vehicle 1. The first target trajectory TR1 may not be appropriate from a viewpoint to avoid a collision. For example, when function or performance of the automated driving control device 100 is limited, the avoidance target is not recognized. Even if the avoidance target is recognized, an accuracy of the recognized position is low. Therefore, if the vehicle 1 travels to follow such a first target trajectory TR1, it will conflict with a restrict condition (e.g., a Y-direction distance between the avoidance target and the vehicle 1 in a case where X position of the former coincides with that of the latter). Hence, the second target trajectory TR2 of which the Y-direction distance does not conflict with the restrict condition is generated.

Figure 4:
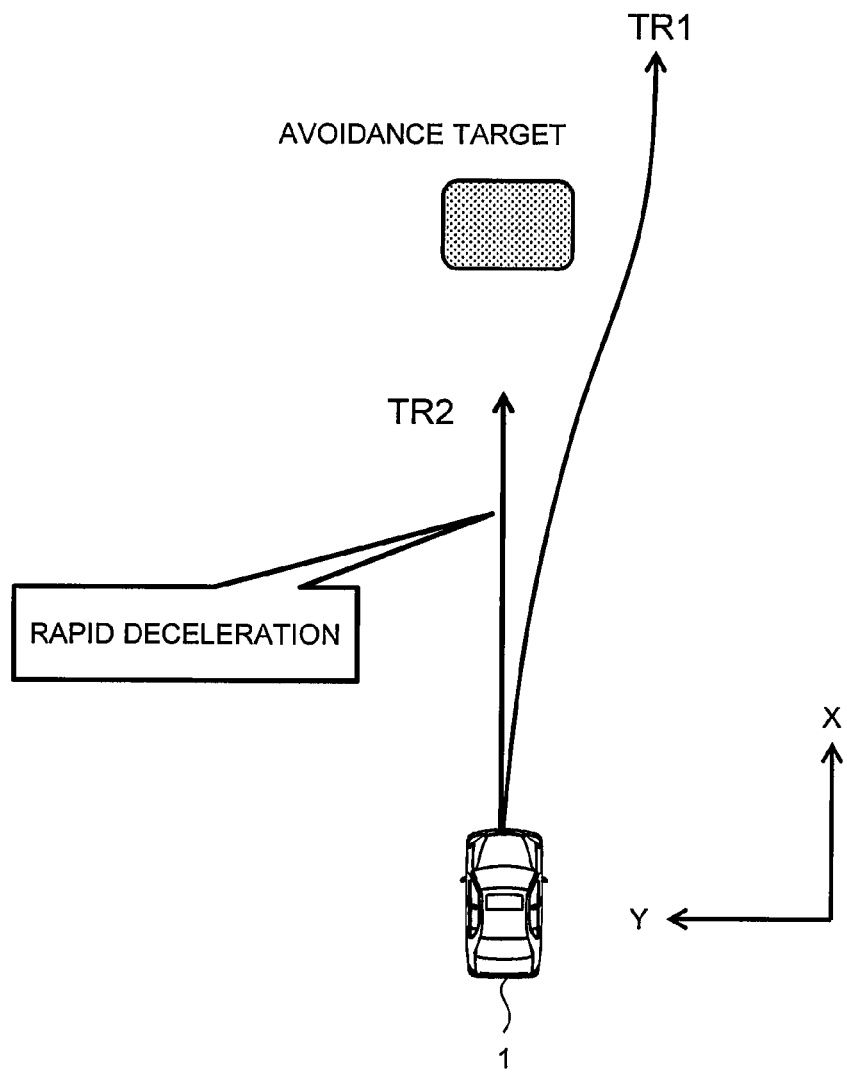
FIG. 4 is a conceptual diagram illustrating another example of the travel assist control according to the first embodiment.

FIG. 4 shows another example. In the example shown in FIG. 4, the automated driving control device 100 generates the first target trajectory TR1 that includes the target speed [VXi, VYi]. If the vehicle 1 travels to follows such the first target trajectory TR1, it will conflict with the restrict condition (e.g., Time to Collision TTC). Hence, the second target trajectory TR2 of which the Time to Collision TTC does not conflict with the restrict condition.

Figure 5:
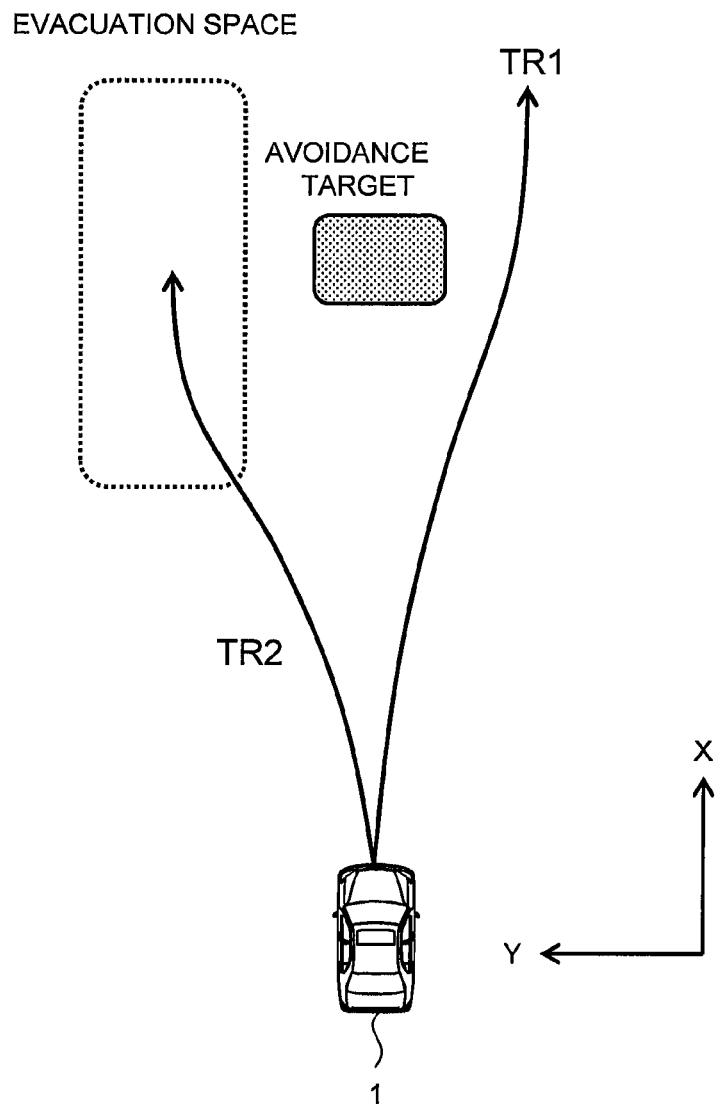
FIG. 5 is a conceptual diagram illustrating yet another embodiment of the travel assist control according to the first embodiment.

FIG. 5 shows still another example. In the example shown in FIG. 5, the second target trajectory TR2 heading for an evacuation space EA around the vehicle 1 is generated. The evacuation space EA is located outside a current driving lane. The evacuation space EA is specified by appropriately combining surrounding circumstances information of the vehicle 1, map information in the vicinity of the current traveling lane and network information. The second target trajectory TR2 shown in FIG. 5 also corresponds to the target trajectory TR that does not conflict with restrict condition.

During the execution of the travel assist control, the vehicle travel control device 200 judges whether or not the "resurgence condition" is satisfied by using the first target trajectory TR1 that is received from the automated driving control device 100. The resurgence condition is a condition to judge whether or not to return from the execution of the travel assist control to the execution of the vehicle travel control. Specific examples of the resurgence condition will be described later. If it is judged that the resurgence condition is satisfied, the vehicle travel control device 200 terminates the generation of the second target trajectory TR2 and return to the execution of the vehicle travel control based on the first target trajectory TR1.

Figure 6:
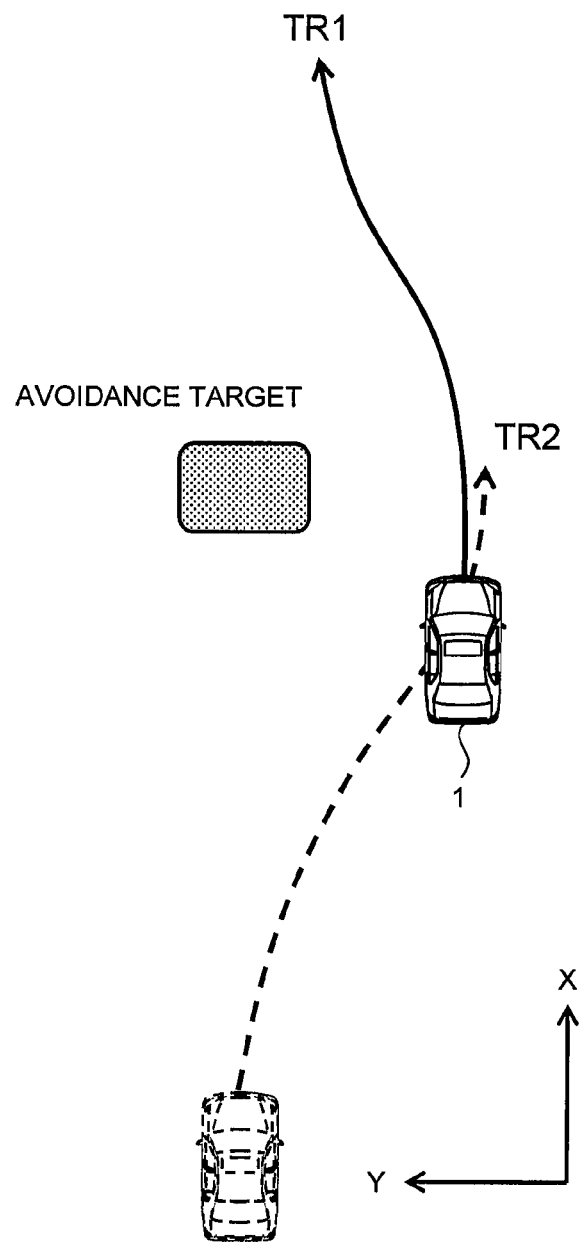
FIG. 6 is a conceptual diagram illustrating an example to return from the travel assist control to vehicle travel control relating to the first embodiment.
Figure 7:
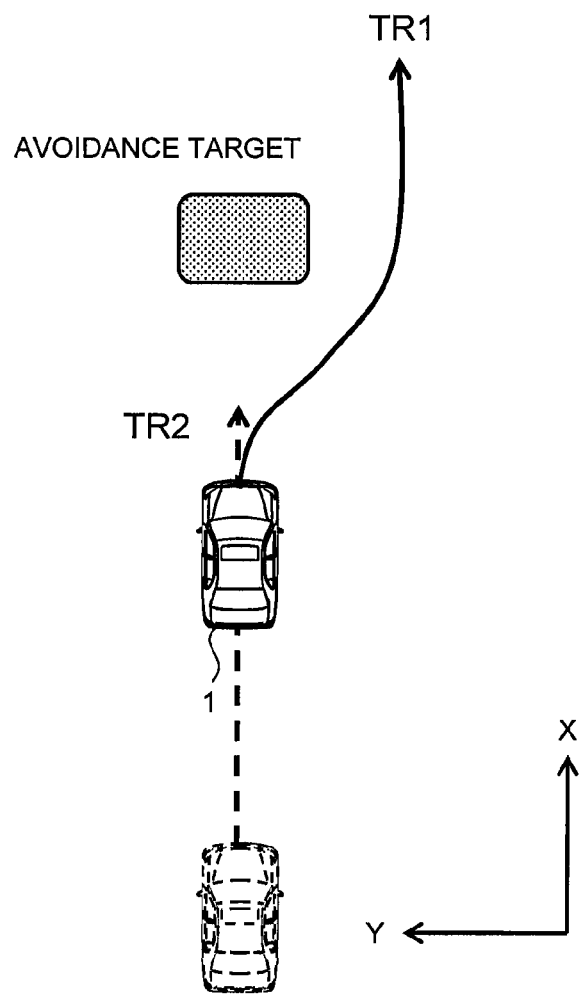
FIG. 7 is a conceptual diagram illustrating another example to return from the travel control to the vehicle travel control according to the first embodiment.
Figure 8:
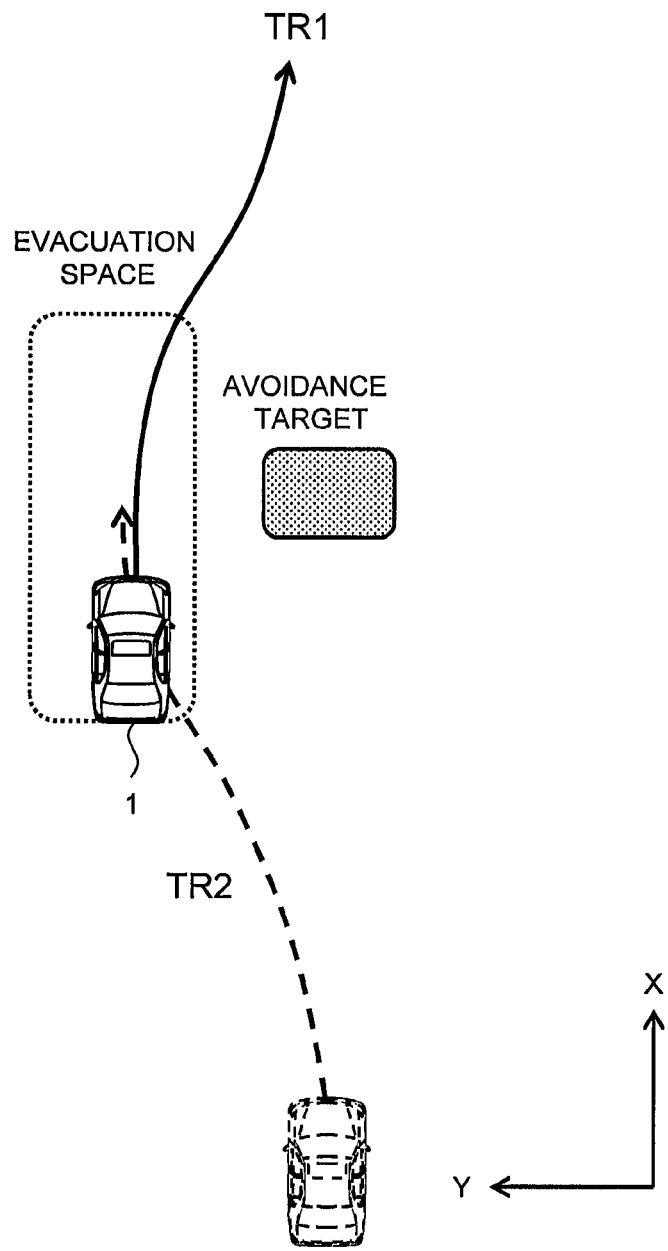
FIG. 8 is a conceptual diagram illustrating yet another example to return from the travel assist control to the vehicle travel control according to the first embodiment.

FIG. 6 shows the resurgence from the execution of the vehicle assist control to that of the vehicle travel control in the example shown in FIG. 3. Similar to FIG. 6, FIGS. 7 and 8 show the resurgence in the examples shown in FIGS. 4 and 5, respectively. In the examples shown in FIGS. 6 to 8, it is judged that the resurgence condition is satisfied before the vehicle 1 reaches a tip of the second target trajectory TR2 indicated by the broken line. The second target trajectory TR2 shown by the broken line is a past target trajectory TR that was generated when it was judged to conflict with the restrict condition.

In the examples shown in FIGS. 6 to 8, vehicle travel according to the second target trajectory TR2 is switched to that according to first target trajectory TR1 during the course of the travel according to the second target trajectory TR2. The reason why such a switching is enabled is that the first target trajectory TR1 is generated during the execution of the travel assist control and also the judgement of the resurgence condition is performed by using the first target trajectory TR1. As described above, according to the vehicle control system of the first embodiment, it is possible to realize automatic resurgence from the travel assist control to the vehicle travel control. This resurgence is performed when it is judged that the resurgence condition is satisfied. Therefore, according to the first embodiment, it is possible to secure a travel safety level SL at the resurgence to a certain level or higher.

The automated driving control device 100 and the vehicle travel control device 200 may be designed and developed separately. For example, the vehicle travel control device 200 responsible for the vehicle travel control is designed and developed by developers (typically a vehicle manufacturer) who are familiar with mechanical and vehicle motion characteristics. In this instance, reliability of the travel assist control function GD of the vehicle travel control device 200 is very high. Given the use of the travel assist control function GD having a high reliability, an automated driving provider is able to design and develop software for the automated driving control device 100. In that sense, the vehicle travel control device 200 can be said to be a platform for automated driving services.

Hereinafter, the vehicle control system 10 according to the first embodiment will be described in more detail.

2. Automated Driving Control Device 100

2-1. Configuration Example

Figure 9:
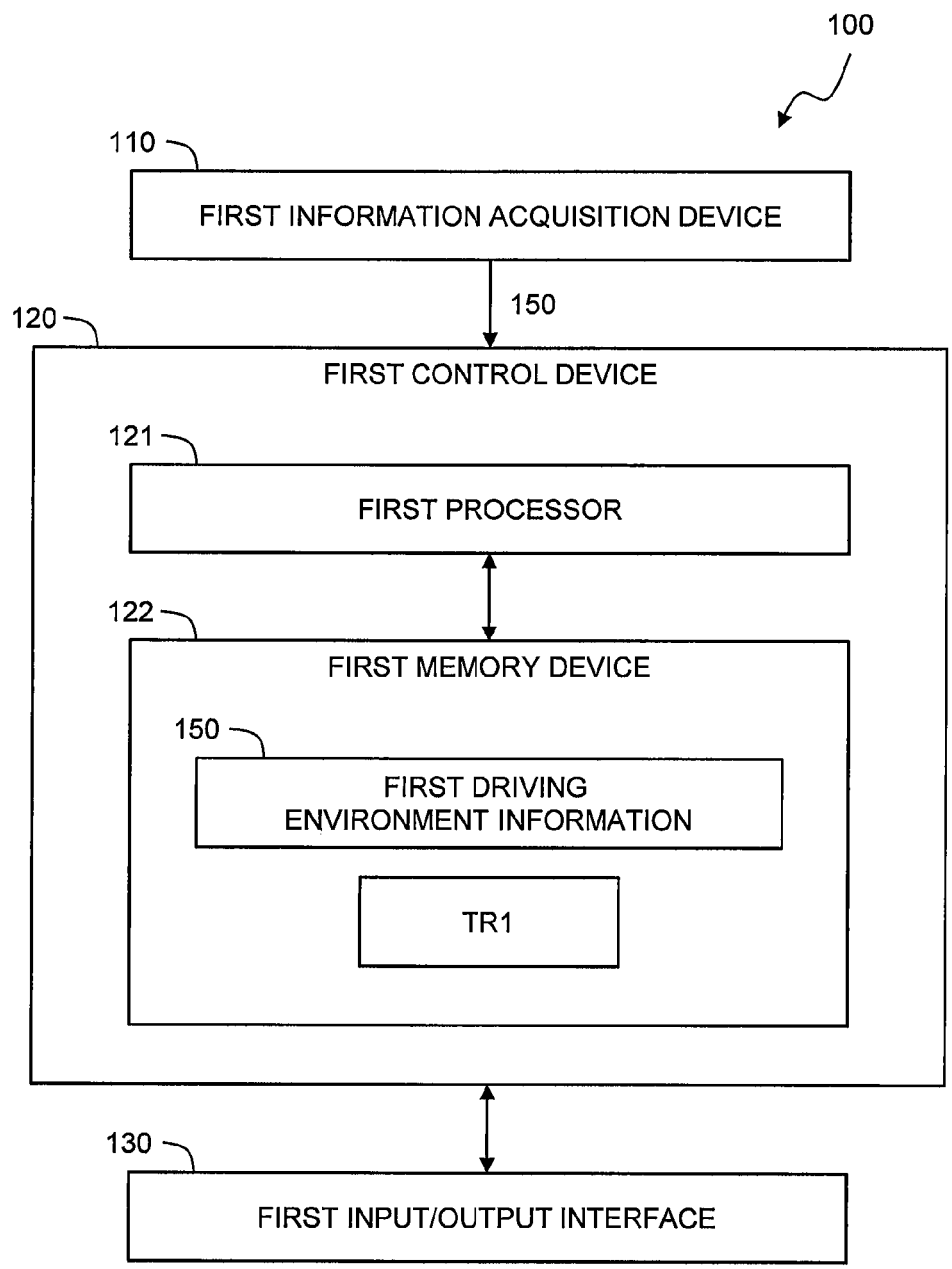
FIG. 9 is a block diagram showing a configuration example of an automated driving control device according to the first embodiment.

FIG. 9 is a block diagram showing a configuration example of the automated driving control device 100 according to the first embodiment. The automated driving control device 100 is provided with a first information acquisition device 110, a first control device 120, and a first input/output interface 130.

The first information acquisition device 110 acquires first driving environment information 150. The first driving environment information 150 is information indicating a driving environment for the vehicle 1 and is used for the automated driving of the vehicle 1.

Figure 10:
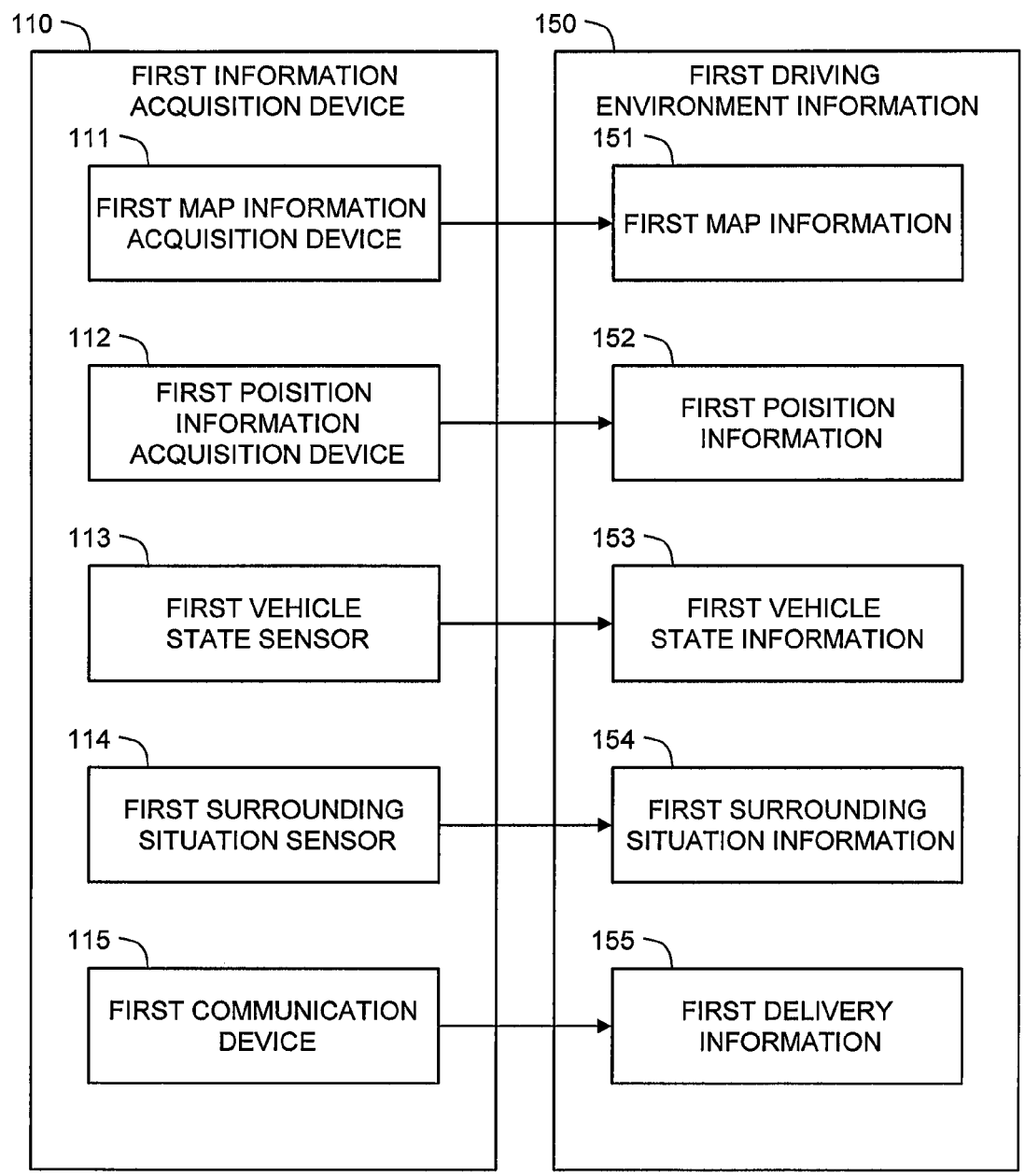
FIG. 10 is a block diagram showing an example of a first information acquisition device and first driving environment information in the automated driving control device according to the first embodiment.

FIG. 10 is a block diagram showing an example of the first information acquisition device 110 and the first driving environment information 150. The first information acquisition device 110 includes a first map information acquisition device 111, a first position information acquisition device 112, a first vehicle state sensor 113, a first surrounding situation sensor 114, and a first communication device 115. The first driving environment information 150 includes first map information 151, first position information 152, first vehicle state information 153, first surrounding situation information 154, and first delivery information 155.

The first map information acquisition device 111 acquires the first map information 151. The first map information 151 includes, for example, information on a lane configuration and a road shape. The first map information acquisition device 111 acquires the first map information 151 of a necessary area from a map database. The map database may be stored in a predetermined memory device mounted on the vehicle 1, or may be stored in a management server outside the vehicle 1. In the latter case, the first map information acquisition device 111 communicates with the management server to acquire the necessary first map information 151.

The first position information acquisition device 112 acquires the first position information 152 indicating a position and an orientation of the vehicle 1. For example, the first position information acquisition device 112 includes a GPS (Global Positioning System) device for measuring the position and the orientation of the vehicle 1. The first position information acquisition device 112 may perform well-known localization to increase accuracy of the first position information 152.

The first vehicle state sensor 113 acquires the first vehicle state information 153 indicating a state of the vehicle 1. For example, the first vehicle state sensor 113 includes a vehicle speed sensor, a yaw rate sensor, an acceleration sensor, a steering angle sensor, and the like. The vehicle speed sensor detects a vehicle speed (i.e., a speed of the vehicle 1). The yaw rate sensor detects a yaw rate of the vehicle 1. The acceleration sensor detects an acceleration (e.g., a lateral acceleration, a longitudinal acceleration, a vertical acceleration) of the vehicle 1. The steering angle sensor detects a steering angle (a wheel turning angle) of the vehicle 1.

The first surrounding situation sensor 114 recognizes (detects) a situation around the vehicle 1. For example, the first surrounding situation sensor 114 includes at least one of a camera, a LIDAR (Laser Imaging Detection and Ranging), and a radar. The first surrounding situation information 154 indicates a result of recognition by the first surrounding situation sensor 114. For example, the first surrounding situation information 154 includes target information about a target recognized by the first surrounding situation sensor 114. The target is exemplified by a surrounding vehicle, a pedestrian, a roadside structure, an obstacle, a white line (lane marking), and the like. The target information includes information on a relative position and a relative velocity of the target with respect to the vehicle 1.

The first communication device 115 communicates with the outside of the vehicle 1. For example, the first communication device 115 communicates with an external device outside of the vehicle 1 via a communication network. The first communication device 115 may perform V2I communication (vehicle-to-infrastructure communication) with a surrounding infrastructure. The first communication device 115 may perform V2V communication (vehicle-to-vehicle communication) with a surrounding vehicle. The first delivery information 155 is information acquired through the first communication device 115. For example, the first delivery information 155 includes information on the surrounding vehicle and road traffic information (e.g., road work zone information, accident information, traffic restriction information, and traffic jam information).

It should be noted that a part of the first information acquisition device 110 may be included in the vehicle travel control device 200. That is, the automated driving control device 100 and the vehicle travel control device 200 may share a part of the first information acquisition device 110. In that case, the automated driving control device 100 and the vehicle travel control device 200 exchange necessary information with each other.

Referring again to FIG. 9, the configuration example of the automated driving control device 100 is described. The first input/output interface 130 is communicably connected with the vehicle travel control device 200.

The first control device 120 (i.e., a first control device) is an information processing device for executing a variety of processing. For example, the first control device 120 is a microcomputer. The first control device 120 is also called an ECU (Electronic Control Unit). More specifically, the first control device 120 includes a first processor 121 and a first memory device 122.

A variety of information is stored in the first memory device 122. For example, the first driving environment information 150 acquired by the first information acquisition device 110 is stored in the first memory device 122. The first memory device 122 is exemplified by a volatile memory, a nonvolatile memory, and a HDD (Hard Disk Drive).

The first processor 121 executes automated driving software which is a computer program. The automated driving software is stored in the first memory device 122 or recorded on a computer-readable recording medium. The functions of the first control device 120 are realized by the first processor 121 executing the automated driving software.

The first control device 120 (the first processor 121) executes the management of the automated driving of the vehicle 1. In particular, the first control device 120 generates the first target trajectory TR1. Hereinafter, generating the first target trajectory TR1 will be described in more detail.

2-2. Generation of First Target Trajectory

Figure 11:
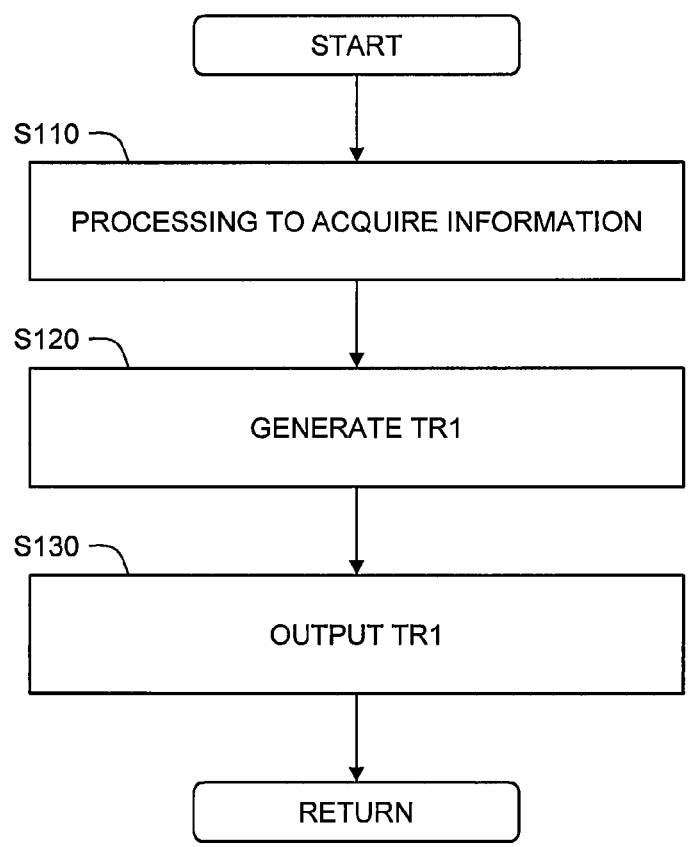
FIG. 11 is a flowchart showing processing executed by the automated driving control device according to the first embodiment.

FIG. 11 is a flow chart showing processing by the first control device 120 of the automated driving control device 100 according to the first embodiment. During the automated driving of the vehicle 1, the processing flow shown in FIG. 11 is repeatedly executed at a regular interval.

At first, the first control device 120 acquires the first driving environment information 150 from the first information acquisition device 110 (step S110). The first driving environment information 150 is stored in the first memory device 122.

Subsequent to the step S110, the first control device 120 generates the first target trajectory TR1 for the automated driving of the vehicle 1, based on the first driving environment information 150 (step S120). More specifically, the first control device 120 generates a travel plan of the vehicle 1 during the automated driving, based on the first driving environment information 150. Then, the first control device 120 generates the first target trajectory TR1 as a target trajectory for the vehicle 1 to travel in accordance with the travel plan.

For example, the first control device 120 generates the first target trajectory TR1 for traveling while maintaining a current travel lane. More specifically, based on the first map information 151 (the lane configuration) and the first position information 152, the first control device 120 recognizes a travel lane in which the vehicle 1 is traveling and acquires a configuration shape of the travel lane ahead of the vehicle 1. Then, the first control device 120 generates the first target trajectory TR1 for traveling while maintaining the travel lane, based on the acquired configuration shape of the travel lane ahead of the vehicle 1.

As another example, the first control device 120 generates the first target trajectory TR1 for making a lane change. More specifically, based on the first map information 151 (the lane configuration), the first position information 152, and a destination, the first control device 120 plans to make a lane change in order to reach the destination. Then, the first control device 120 generates the first target trajectory TR1 for realizing the lane change based on the lane change plan.

As yet another example, the first control device 120 generates the first target trajectory TR1 for avoiding a collision between the vehicle 1 and a surrounding object. More specifically, based on the first surrounding situation information 154 (the target information), the first control device 120 recognizes an avoidance target ahead of the vehicle 1. Furthermore, based on the first vehicle state information 153 and the first surrounding situation information 154, the first control device 120 predicts respective future positions of the vehicle 1 and the avoidance target and calculates a possibility that the vehicle 1 collides with the avoidance target. If the possibility that the vehicle 1 collides with the avoidance target is equal to or higher than a threshold, the first control device 120 generates the first target trajectory TR1 for avoiding the collision based on the first vehicle state information 153 and the first surrounding situation information 154. Typically, the first target trajectory TR1 for avoiding the collision demands at least one of the steering and the deceleration.

Subsequent to the step S120, the first control device 120 outputs the first target trajectory TR1 to the vehicle travel control device 200 via the first input/output interface 130 (step S130). Every time the first target trajectory TR1 is updated, the latest first target trajectory TR1 is output to the vehicle travel control device 200.

3. Vehicle Travel Control Device 200

3-1. Configuration Example

Figure 12:
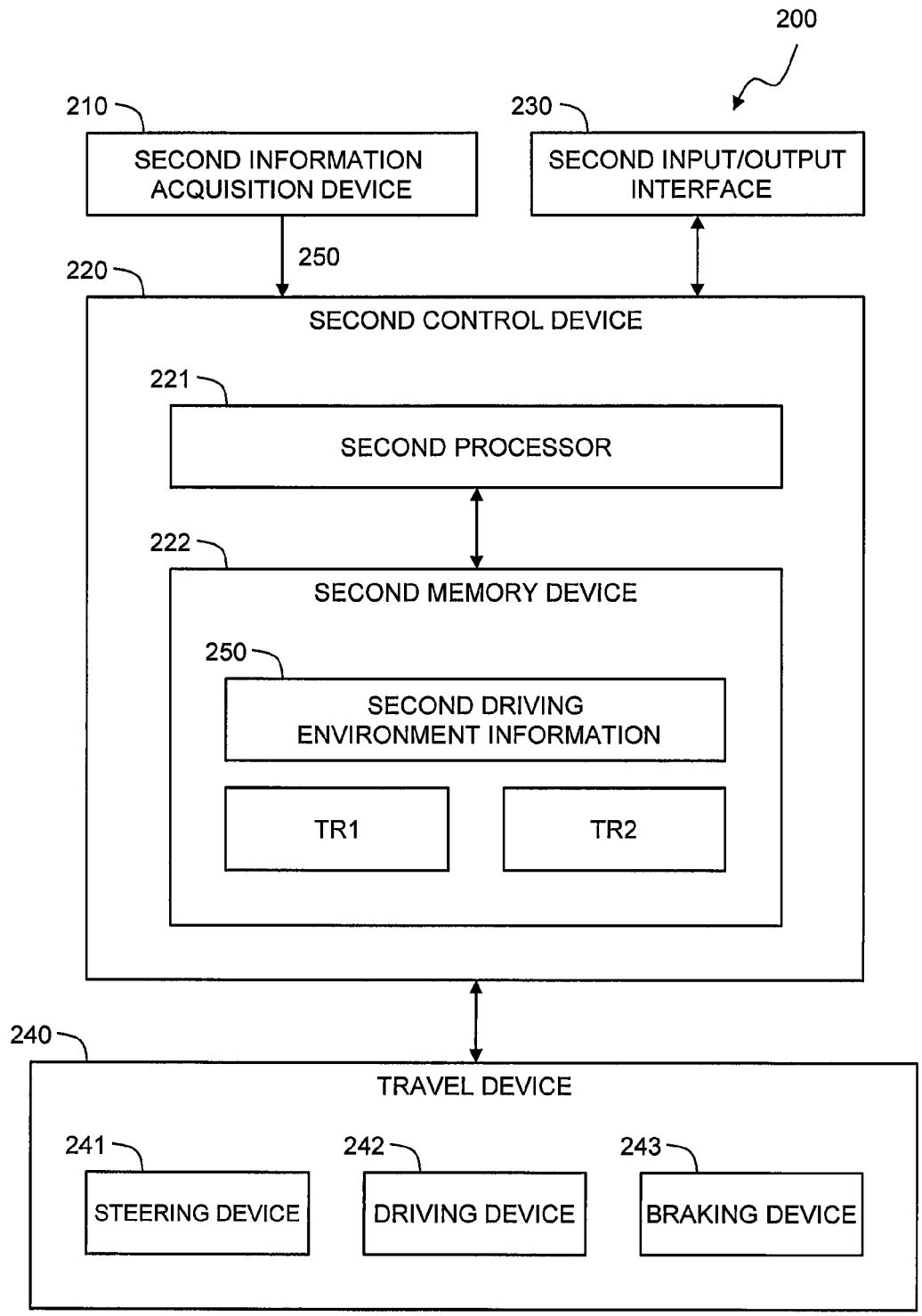
FIG. 12 is a block diagram showing a configuration example of a vehicle travel control device according to the first embodiment.

FIG. 12 is a block diagram showing a configuration example of the vehicle travel control device 200 according to the first embodiment. The vehicle travel control device 200 is provided with a second information acquisition device 210, a second control device 220, a second input/output interface 230, and a travel device 240.

The second information acquisition device 210 acquires second driving environment information 250. The second driving environment information 250 is information indicating a driving environment for the vehicle 1 and is used for the vehicle travel control and the travel assist control.

Figure 13:
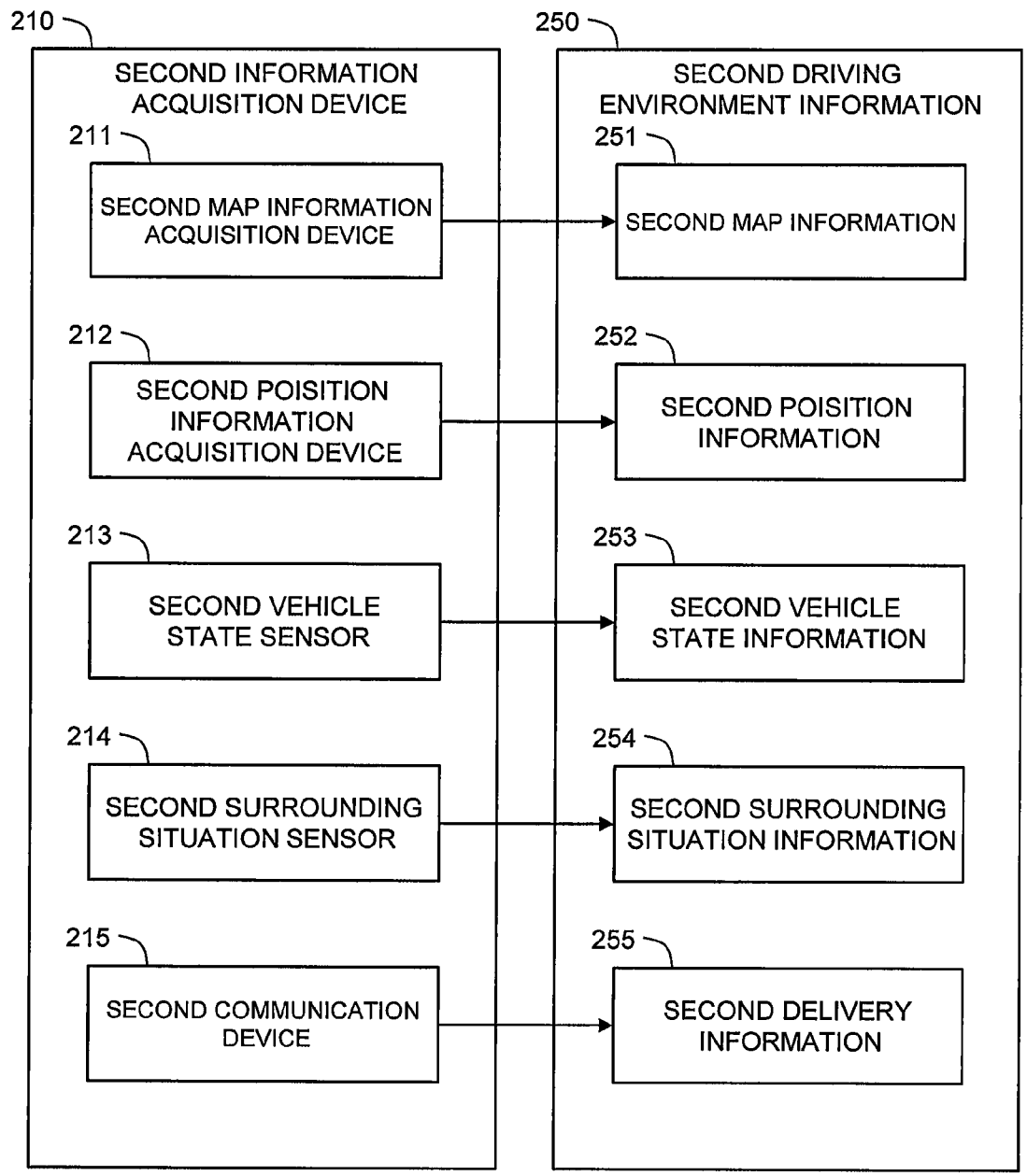
FIG. 13 is a block diagram showing an example of a second information acquisition device and second driving environment information in the vehicle travel control device according to the first embodiment.

FIG. 13 is a block diagram showing an example of the second information acquisition device 210 and the second driving environment information 250. The second information acquisition device 210 includes a second map information acquisition device 211, a second position information acquisition device 212, a second vehicle state sensor 213, a second surrounding situation sensor 214, and a second communication device 215. The second driving environment information 250 includes second map information 251, second position information 252, second vehicle state information 253, second surrounding situation information 254, and second delivery information 255.

The second map information acquisition device 211 acquires the second map information 251. The second map information 251 indicates a lane configuration and a road shape. The second map information acquisition device 211 acquires the second map information 251 of a necessary area from a map database. The map database may be stored in a predetermined memory device mounted on the vehicle 1, or may be stored in a management server outside the vehicle 1. In the latter case, the second map information acquisition device 211 communicates with the management server to acquire the necessary second map information 251.

The second position information acquisition device 212 acquires the second position information 252 indicating a position and an orientation of the vehicle 1. For example, the second position information acquisition device 212 includes a GPS device for measuring the position and the orientation of the vehicle 1. The second position information acquisition device 212 may perform well-known localization to increase accuracy of the second position information 252.

The second vehicle state sensor 213 acquires the second vehicle state information 253 indicating a state of the vehicle 1. For example, the second vehicle state sensor 213 includes a vehicle speed sensor, a yaw rate sensor, an acceleration sensor, a steering angle sensor, and the like. The vehicle speed sensor detects a vehicle speed (i.e., a speed of the vehicle 1). The yaw rate sensor detects a yaw rate of the vehicle 1. The acceleration sensor detects an acceleration (e.g., a lateral acceleration, a longitudinal acceleration, a vertical acceleration) of the vehicle 1. The steering angle sensor detects a steering angle (a wheel turning angle) of the vehicle 1.

The second surrounding situation sensor 214 recognizes (detects) a situation around the vehicle 1. For example, the second surrounding situation sensor 214 includes at least one of a camera, a LIDAR and a radar. The second surrounding situation information 254 indicates a result of recognition by the second surrounding situation sensor 214. For example, the second surrounding situation information 254 includes information (target information) on a target recognized by the second surrounding situation sensor 214. The target is exemplified by a surrounding vehicle, a pedestrian, a roadside structure, an obstacle, a white line (lane marking), and the like. The target information includes information on a relative position and a relative velocity of the target with respect to the vehicle 1.

The second communication device 215 communicates with the outside of the vehicle 1. For example, the second communication device 215 communicates with an external device outside of the vehicle 1 via a communication network. The second communication device 215 may perform V2I communication with a surrounding infrastructure. The second communication device 215 may perform V2V communication with a surrounding vehicle. The second delivery information 255 is information acquired through the second communication device 215. For example, the second delivery information 255 includes information on the surrounding vehicle and road traffic information.

It should be noted that the first information acquisition device 110 and the second information acquisition device 210 may be partially identical. For example, the first map information acquisition device 111 and the second map information acquisition device 211 may be identical. The first position information acquisition device 112 and the second position information acquisition device 212 may be identical. The first vehicle state sensor 113 and the second vehicle state sensor 213 may be identical. That is to say, the automated driving control device 100 and the vehicle travel control device 200 may share a part of the second information acquisition device 210. In that case, the automated driving control device 100 and the vehicle travel control device 200 exchange necessary information with each other.

Referring again to FIG. 12, the configuration example of the vehicle travel control device 200 is described. The second input/output interface 230 is communicably connected with the automated driving control device 100.

The travel device 240 includes a steering device 241, a driving device 242, and a braking device 243. The steering device 241 turns (i.e., changes a direction of) a wheel of the vehicle 1. For example, the steering device 241 includes a power steering (EPS: Electric Power Steering) device. The driving device 242 is a power source that generates a driving force. The driving device 242 is exemplified by an engine, an electric motor, an in-wheel motor, and the like. The braking device 243 generates a braking force.

The second control device 220 (i.e., a second control device) is an information processing device for executing a variety of processing. For example, the second control device 220 is a microcomputer. The second control device 220 is also called an ECU. More specifically, the second control device 220 includes a second processor 221 and a second memory device 222.

A variety of information is stored in the second memory device 222. For example, the second driving environment information 250 acquired by the second information acquisition device 210 is stored in the second memory device 222. The second memory device 222 is exemplified by a volatile memory, a nonvolatile memory, an HDD, and the like.

The second processor 221 executes vehicle travel control software which is a computer program. The vehicle travel control software is stored in the second memory device 222 or recorded on a computer-readable recording medium. The functions of the second control device 220 are realized by the second processor 221 executing the vehicle travel control software.

3-2. Vehicle Travel Control

The second control device 220 executes the vehicle travel control by controlling an operation of the travel device 240. Specifically, the second control device 220 controls the steering, the acceleration, and the deceleration of the vehicle 1. The second control device 220 executes the vehicle travel control by controlling an operation of the travel device 240. More specifically, the second control device 220 controls the steering (turning of the wheel) of the vehicle 1 by controlling an operation of the steering device 241. The second control device 220 controls the acceleration of the vehicle 1 by controlling an operation of the driving device 242. The second control device 220 controls the deceleration of the vehicle 1 by controlling an operation of the braking device 243.

In particular, the second control device 220 executes the vehicle travel control such that the vehicle 1 follows the target trajectory TR. In this case, the second control device 220 calculates a deviation between the vehicle 1 and the target trajectory TR based on the target trajectory TR, the second position information 252, and the second vehicle state information 253. The deviation includes a lateral deviation (i.e., a Y-direction deviation), a yaw angle deviation (i.e., an azimuth angle deviation), and a velocity deviation. Then, the second control device 220 executes the vehicle travel control such that the deviation between the vehicle 1 and the target trajectory TR decreases.

The second control device 220 calculates a control amount for controlling the travel device 240, that is, a control amount of at least one of the steering, the acceleration, and the deceleration. The control amount required for the vehicle 1 to follow the target trajectory TR, that is, the control amount required for reducing the deviation between the vehicle 1 and the target trajectory TR is hereinafter referred to as a "required control amount CON." The required control amount CON includes a target steering angle, a target yaw rate, a target velocity, a target acceleration, a target deceleration, a target torque and a target current. The second control device 220 controls the operation of the travel device 240, that is, controls at least one of the steering, the acceleration, and the deceleration in accordance with the required control amount CON.

3-3. Travel Assist Control

The second control device 220 also executes the travel assist control. As the travel assist control, the collision avoidance control and the lane departure suppressing control are exemplified. The collision avoidance control assists to avoid a collision between the vehicle 1 and a surrounding object (i.e., the avoidance target). The lane departure suppressing control suppresses a departure of the vehicle 1 from the driving lane. Hereinafter, processing related to the travel assist control will be described.

3-4. Processing Related to Travel Assist Control

Figure 14:
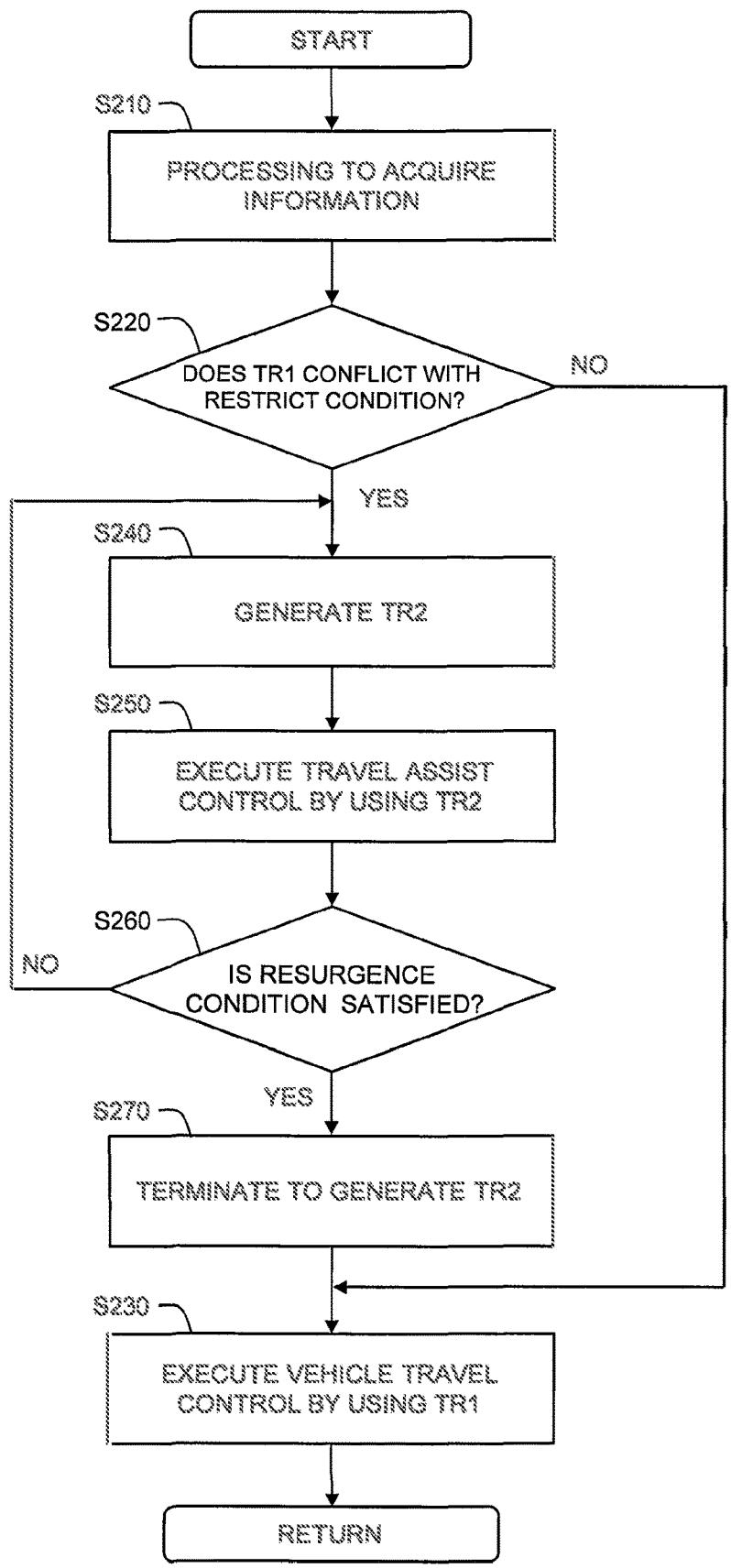
FIG. 14 is a flowchart showing an example of processing related to the travel assist control executed by the vehicle travel control device according to the first embodiment.

FIG. 14 is a flow chart showing an example of processing related to the travel assist control by the second control device 220 (the second processor 221). The processing flow shown in FIG. 14 is repeatedly executed at a regular interval. Here, the automated driving of the vehicle 1 is in execution.

At first, the second control device 220 acquires the second driving environment information 250 from the second information acquisition device 210 (step S210). The second driving environment information 250 is stored in the second memory device 222. Moreover, the second control device 220 receives information indicating the first target trajectory TR1 from the automated driving control device 100 via the second input/output interface 230. The information indicating the first target trajectory TR1 is stored in the second memory device 222.

Subsequent to the step S210, the second control device 220 judges, based on the second driving environment information 250, whether or not the travel assist control needs to be executed (step S220). In other words, the second control device 220 judges whether or not the travel of the vehicle 1 based on the first target trajectory TR1 conflicts with the restrict condition.

As an example of the travel assist control, consider the collision avoidance control. The second control device 220 recognizes the avoidance target (e.g., a surrounding vehicle and a walker) in front of the vehicle 1 based on the second surrounding situation information 254 (the object information). Further, the second control device 220 predicts future positions of the vehicle 1 and the avoidance target based on the second vehicle state information 253 and the second surrounding situation information 254 (the object information). Then, the second control device 220 judges whether or not the travel of the vehicle 1 based on the first target trajectory TR1 conflicts with the restrict condition. The restrict condition includes a condition where the Y-direction distance DY between the avoidance target and the vehicle 1 is not less than or equal to a threshold TH1 when the X position of the avoidance target and the vehicle 1 coincide. The restrict condition includes a condition where the Time to collision TTC is not less than or equal to a threshold TH2.

As another example of the travel assist control, the lane departure suppressing control will be considered. For example, when the vehicle 1 fluctuates in the travel lane and approaches a compartment line of the travel lane, the lane departure suppression control steers the vehicle 1 back to the central of the travel lane. For this purpose, the second control device 220 recognizes, on the basis of the second surrounding situation information 254, recognizes the compartment line of the lane along which the vehicle 1 travels and monitors a distance DL between the first target trajectory TR1 and the compartment line. Then, the second control device 220 judges whether or not the travel of the vehicle 1 based on the first target trajectory TR1 conflicts with the restrict condition. The restrict condition includes a condition where the distance DL to the compartment line is not less than or equal to a threshold TH3.

If the judgement result of the step S220 is negative, the second control device 220 executes the vehicle travel control by using the first target trajectory TR1 (step S230). The second control device 220 calculates control amount (i.e., the required control amount CON) required to reduce a deviation between vehicle 1 and the first target trajectory TR1. The second control device 220 then controls an operation of the travel device 240 in accordance with the required control amount CON. That is, the second control device 220 controls at least one of the steering, the acceleration and the deceleration.

If the judgement result of the step S220 is positive, the second control device 220 generates the second target trajectory TR2 (step S240). The second target trajectory TR2 is generated based on the restrict condition with which the first target trajectory TR1 conflicted.

For example, if the first target trajectory TR1 conflicted with the restrict condition on the Y-direction distance DY between the avoidance target and the vehicle 1, the second target trajectory TR2 having the Y-direction distance DY greater than the threshold TH1 is generated. If the first target trajectory TR1 conflicted with the restrict condition on the Time to collision TTC to the avoidance target, the second target trajectory TR2 having the Time to collision TTC greater than the threshold TH2 is generated. When the evacuation space EA is specified, the second target trajectory TR2 toward the evacuation space EA may be generated. If the first target trajectory TR1 conflicted with the restrict condition on the distance DL to the compartment line, the second target trajectory TR2 having the distance DL greater than the threshold TH3 is generated. The second control device 220 stores information on the second target trajectory TR2 in the second memory device 222.

Subsequent to the step S240, the second control device 220 executes the travel assist control by using the second target trajectory TR2 (step S250). The second control device 220 calculates control amount (i.e., the required control amount CON) required to reduce a deviation between the vehicle 1 and the second target trajectory TR2. The second control device 220 then controls the operation of the travel device 240 in accordance with the required control amount CON. That is, the second control device 220 controls at least one of the steering, the acceleration and the deceleration.

Subsequent to the step S250, the second control device 220 judges whether or not the resurgence condition is satisfied (step S260). The second control device 220 judges whether or not the resurgence condition is satisfied by using the first target trajectory TR1 that is received during the execution of the travel assist control. The resurgence condition includes a condition that the travel safety level SL of the first target trajectory TR1 is greater than or equal to a predetermined safety level L1. The resurgence condition includes a condition that a match level ML between the first target trajectory TR1 and the second target trajectory TR2 is greater than or equal to a predetermined match level L2.

For example, the travel safety level SL may be evaluated in accordance with the restrict condition with which has been judged to conflict in the processing of the S220. In the conflict event of the restrict condition on the Y-direction distance DY, the travel safety level SL is evaluated based on the Y-direction distance DY. If the Y-direction distance DY is greater than the threshold TH1, it is judged that the travel safety level SL is greater than or equal to the predetermined safety level L1. In the conflict event of the restrict condition on the Time to collision TTC, the travel safety level SL is evaluated based on the Time to collision TTC. If the Time to collision TTC is greater than the threshold TH2, it is judged that the travel safety level SL is greater than or equal to the predetermined safety level L1. In the conflict event of the restrict condition on the distance DL, the travel safety level SL is evaluated on the basis of the distance DL. If the distance DL is greater than the threshold TH3, it is judged that the travel safety level SL is greater than or equal to the predetermined safety level L1.

For example, the match level ML may be evaluated based on a deviation between the first target trajectory TR1 and the second target trajectory TR2 (e.g., a deviation between the target positions and a deviation between the two kinds of the target speed). During the execution of the travel assist control, the second target trajectory TR2 is generated from time to time by modifying the first target trajectory TR1 or is generated separately from the first target trajectory TR1. Therefore, the match level ML is evaluated by comparing the first target trajectory TR1 and the second target trajectory TR2 that are generated at substantially the same time. When the deviation between the first target trajectory TR1 and the second target trajectory TR2 is equal to or less than a threshold TH4, it is judged that the match level ML is equal to or greater than the predetermined match level L2.

The resurgence condition may include a condition where information on safety confirmation has been obtained. The information on safety confirmation is included in the second delivery information 255. The information on safety confirmation is acquired by the second information acquisition device 210 when the vehicle 1 stops as a result of the execution of the travel assist control for avoiding the collision with the avoidance target. When the vehicle 1 stops, the second control device 220 outputs a request signal for requesting a confirmation of the driving safety around the vehicle 1. The request signal is transmitted to an external device outside the vehicle 1 via the second communication device 215. The external device is, for example, a computer of an automated driving management center on which a remote observer resides. The remote observer confirms the driving safety around the vehicle 1 based on the second vehicle state information 253 and the second surrounding situation information 254. The remote observer may consider in the confirmation information on surrounding vehicles and road traffic. After confirming the driving safety around the vehicle 1, the remote observer delivers to the vehicle 1 the information on safety confirmation. It should be noted that the confirmation on driving safety and the delivery of the information on safety confirmation may be automatically performed by the automated driving management server outside the vehicle 1.

If the judgement result of the step S260 is negative, the second control device 220 returns to the processing of the step S240. Otherwise, the second control device 220 terminates to generate the second target trajectory TR2 (step S270). That is, in the processing of the step S260, the second target trajectory TR2 is generated until it is jugged that resurgence condition is satisfied.

Subsequent to the step S270, the second control device 220 executes the processing of the step S230. That is, the second control device 220 executes the vehicle travel control by using the first target trajectory TR1. When the processing of the step S230 is executed subsequent to that of the step S270, the resurgence is performed from the execution of the travel assist control to that of the vehicle travel control.

4. Modified Example

Figure 15:
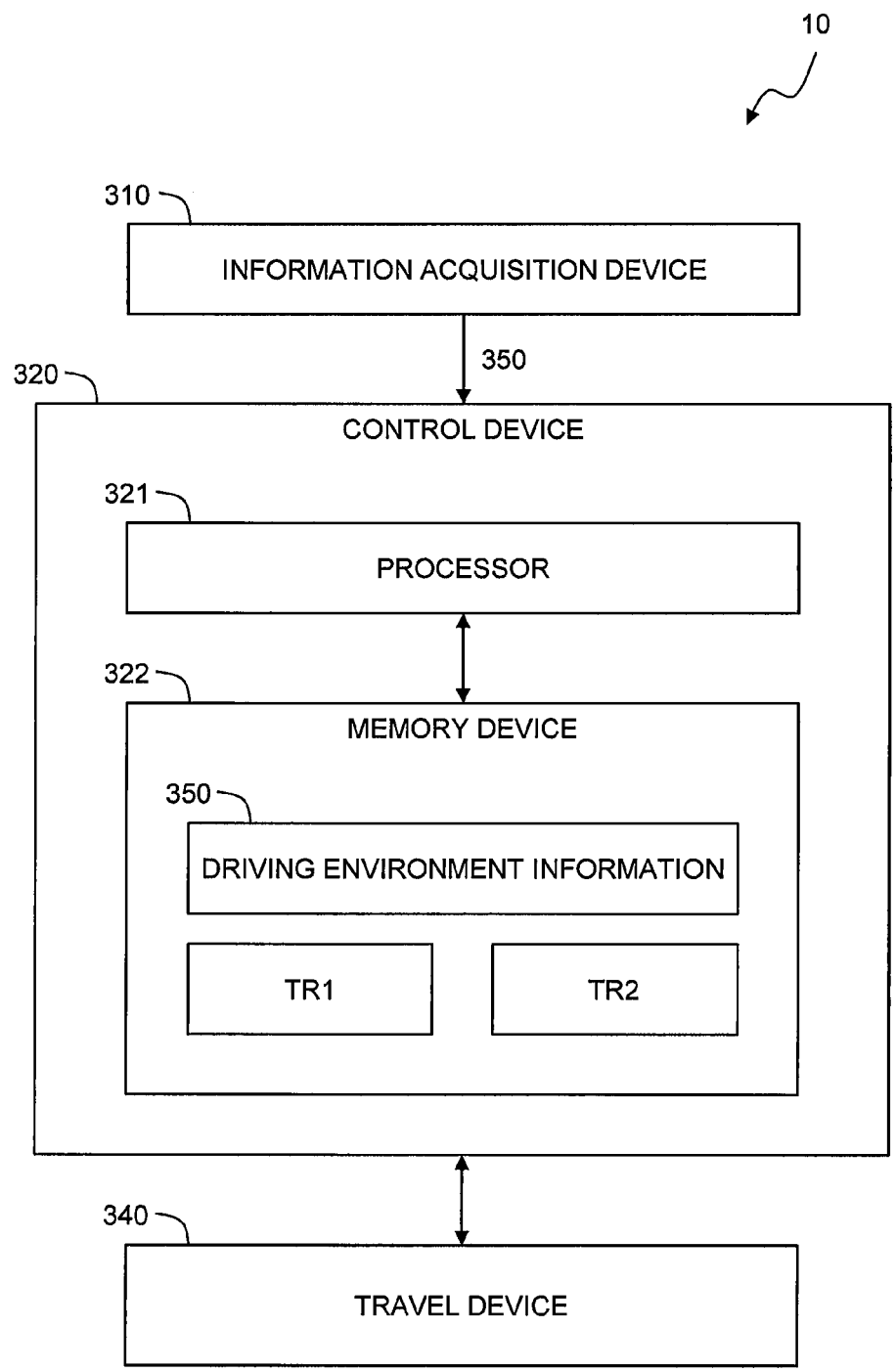
FIG. 15 is a block diagram showing configuration example of the vehicle control system according to a modified example of the first embodiment.

In the first embodiment, it is assumed that the vehicle control system 10 comprises the automated driving control device 100 and the vehicle travel control device 200. However, the automated driving control device 100 and the vehicle travel control device 200 may be comprised of a single control device. FIG. 15 is a block diagram showing a configuration of the vehicle control system 10 according to a modified example of the first embodiment.

The vehicle control system 10 comprises an information acquisition device 310, a control device 320 and a travel device 340.

The information acquisition device 310 obtains the driving environment information 350. The information acquisition device 310 is identical to the first information acquisition device 110 or the second information acquisition device 210. The driving environment information 350 is identical to the first driving environment information 150 or the second driving environment information 250. The travel device 340 is identical to the travel device 240.

The control device 320 includes a processor 321 and a memory device 322. Various information is stored in the memory device 322. For example, the memory device 322 stores the driving environment information 350 acquired by the information acquisition device 310. The processor 321 executes control programs. The control programs are stored in the memory device 322 or recorded in a computer-readable recording medium. The processor 321 executes the control programs to realize various processing executed by the control device 320.

The control device 320 has a function as the first control device 120 of the automated driving control device 100 and a function as the second control device 220 of the vehicle travel control device 200. That is, in the examples shown in FIG. 15, the information acquisition device 310 and the control device 320 correspond to the automated driving control device 100, and the information acquisition device 310, control device 320 and the travel device 340 correspond to the vehicle travel control device 200.

Generally speaking, the vehicle control system according to the first embodiment includes one processor (i.e., the processor 321) or more processors (i.e., the first processor 121 and the second processor 221). The one or more processors executes operations as the automated driving control device 100 and the vehicle travel control device 200 based on the driving environment information stored in one or more storage devices. It should be noted that the modified example described above is also applied to the vehicle control systems according to the embodiments described later.

Second Embodiment

A second embodiment of the present disclosure will be described with reference to FIGS. 16 to 20. Note that descriptions overlapping with those in the first embodiment are omitted as appropriate.

1. Outline

In the vehicle control system according to the second embodiment, the vehicle travel control device 200 transmits the "execution information" of the travel assist control to the automated driving control device 100. The execution information indicates that the second target trajectory TR2 has been generated in the vehicle travel control device 200. The execution information is outputted from the vehicle travel control device 200, for example, when it is judged that the travel of the vehicle 1 based on the first target trajectory TR1 conflicts with the restrict condition. The execution information may include a code COD indicating the restrict condition with which the first target trajectory TR1 conflicts. In the conflict event of the restrict condition on the Y-direction distance DY, a coding COD1 is included in execution information 260. In the conflict event of the restrict condition on the Time to collision TTC, a coding COD2 is included in the execution information 260. In the conflict event of the restrict condition on the distances DL, a coding COD3 is included in the execution information 260.

The output of the execution information is continued until it is judged that the resurgence condition is satisfied. The automated driving control device 100 modifies the first target trajectory TR1 during it receives the execution information. The modified first target trajectory TR1 is referred to as a "first target trajectory TR1*" below.

Figure 16:
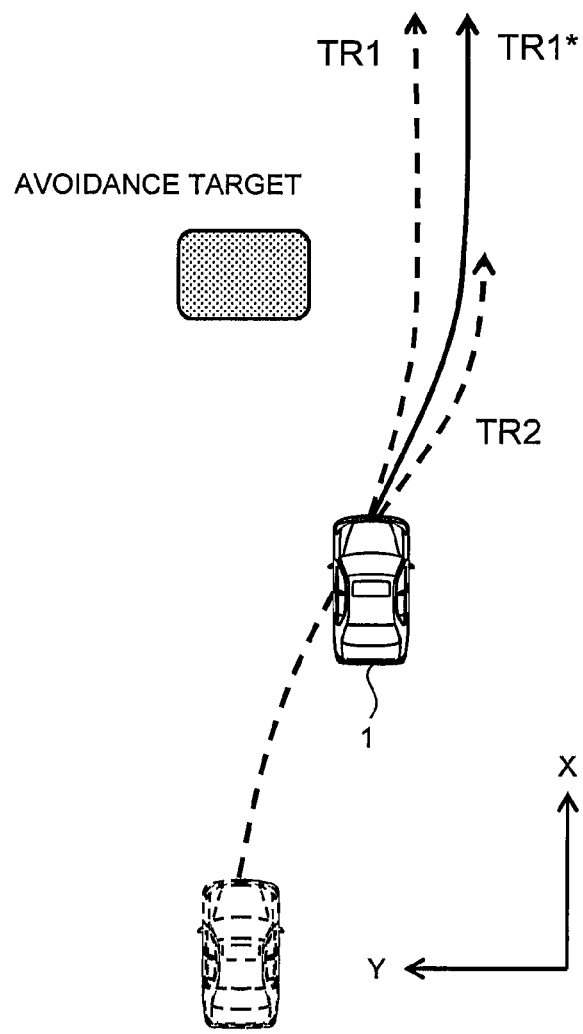
FIG. 16 is a conceptual diagram for explaining an outline of a vehicle control system according to a second embodiment.

The first target trajectory TR1* is generated such that the travel safety level SL is higher than the first target trajectory TR1. FIG. 16 is a conceptual diagram for explaining outline of vehicle control system according to second embodiment. In FIG. 16, the first target trajectory TR1 is drawn in the broken line. This first target trajectory TR1 corresponds to a target trajectory TR generated in the absence of outputting or receiving the execution information. In the example shown in FIG. 16, the first target trajectory TR1* is generated between the second target trajectory TR2 and the first target trajectory TR1. Note that this second target trajectory TR2 is the historical target trajectory TR described in FIGS. 3 and 6.

Figure 17:
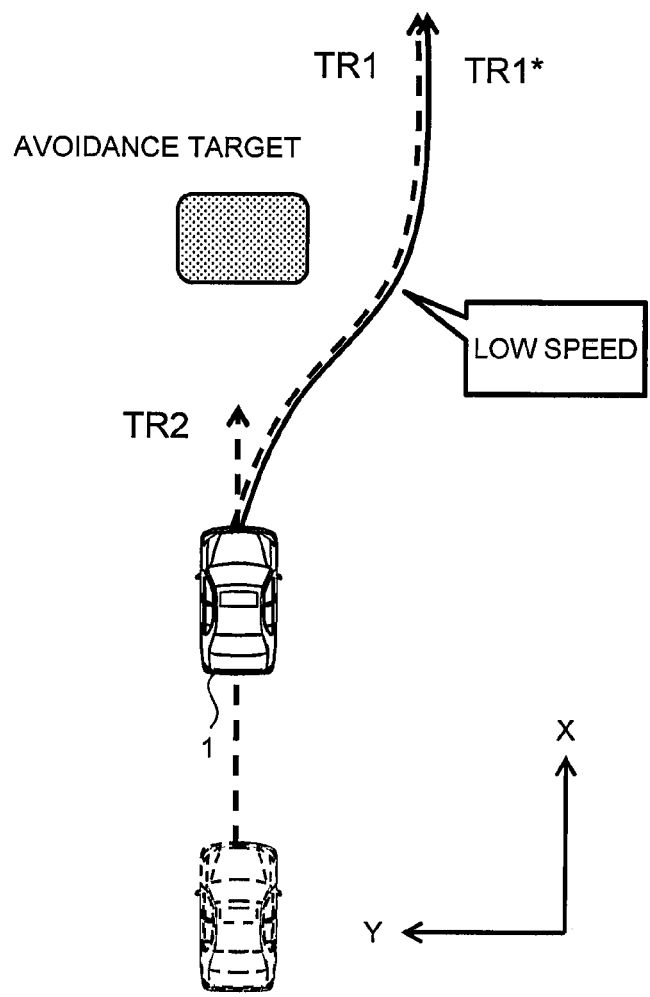
FIG. 17 is a conceptual diagram for explaining the outline of the vehicle control system according to the second embodiment.

In a similar manner to FIG. 16, the first target trajectory TR1 is drawn in the broken line in FIG. 17. In the example shown in FIG. 17, the shape of this first target trajectory TR1 is consistent with that of the first target trajectory TR1*. However, the target speed [VXi, VYi] constituting the first target trajectory TR1* is smaller than that of the first target trajectory TR1. Therefore, the travel safety level SL of the first target trajectory TR1* is higher than that of the first target trajectory TR1. It should be noted that second target trajectory TR2 depicted in FIG. 17 is the historical target trajectory TR described in FIGS. 4 and 7.

Figure 18:
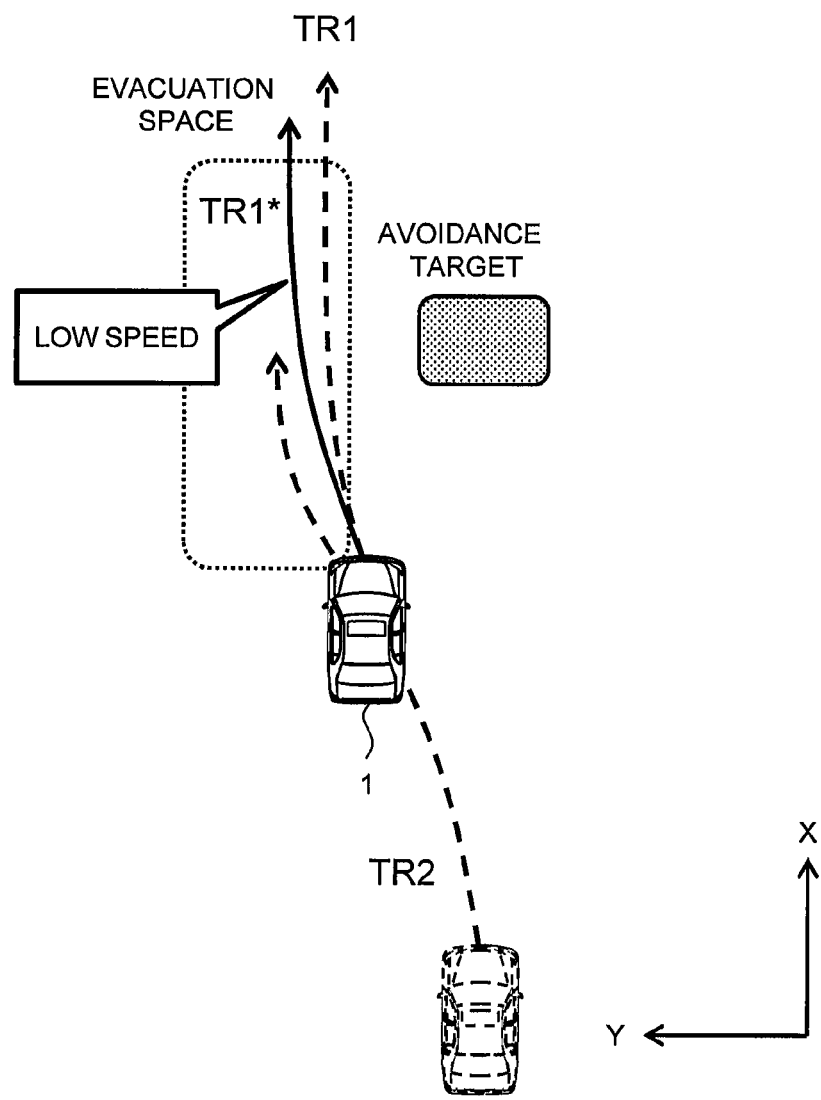
FIG. 18 is a conceptual diagram for explaining the outline of the vehicle control system according to the second embodiment.

In a similar manner to FIGS. 16 and 17, the first target trajectory TR1 is drawn in the broken line in FIG. 18. In the example shown in FIG. 18, the generation methods shown in FIGS. 16 and 17 are combined. That is, in the example shown in FIG. 18, the first target trajectory TR1* is generated between the second target trajectory TR2 and the first target trajectory TR1. Also, the first target trajectory TR1* is generated such that the target speed [VXi, VYi] constituting the first target trajectory TR1* is smaller than that constituting the first target trajectory TR1.

As described in the first embodiment, the judgement of the resurgence condition is executed by using the first target trajectory TR1 received by the vehicle travel control device 200 from the automated driving control device 100 during the execution of the travel assist control. Therefore, if the automated driving control device modifies the first target trajectory TR1, the vehicle travel control device 200 judges the resurgence condition by using the first target trajectory TR1*. And the first target trajectory TR1* has the higher travel safety level SL than the first target trajectory TR1. Therefore, according to the vehicle control system according to the second embodiment, it is more likely to be judged that the resurgence condition is satisfied. Therefore, it is possible to realize in a short time the resurgence from the execution of the travel assist control to the execution of the vehicle travel control.

Hereinafter, vehicle control system 10 according to the second embodiment will be described in more detail.

2. Vehicle Travel Control Device 200

Figure 19:
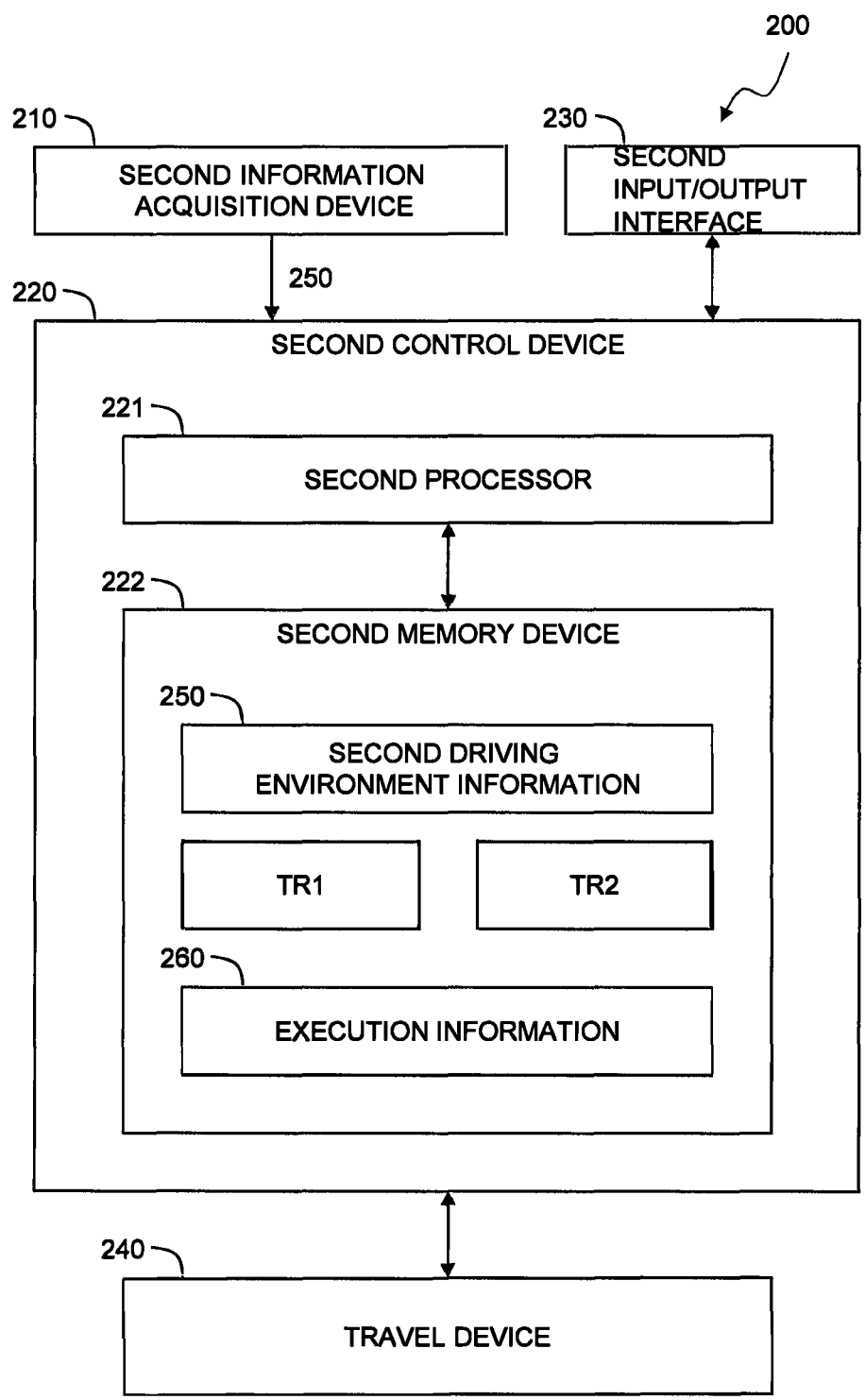
FIG. 19 is a block diagram showing a configuration example of the vehicle travel control device according to the second embodiment.

FIG. 19 is a diagram showing a configuration example of the vehicle travel control device 200 according to the second embodiment. The second control device 220 (the second processor 221) generates the execution information 260. The second control device 220 stores the execution information 260 in the automated driving control device 100 via the second input/output interface 230. The configuration example other than the execution information 260 is as described in FIG. 12.

3. Automated Driving Control Device 100

Figure 20:
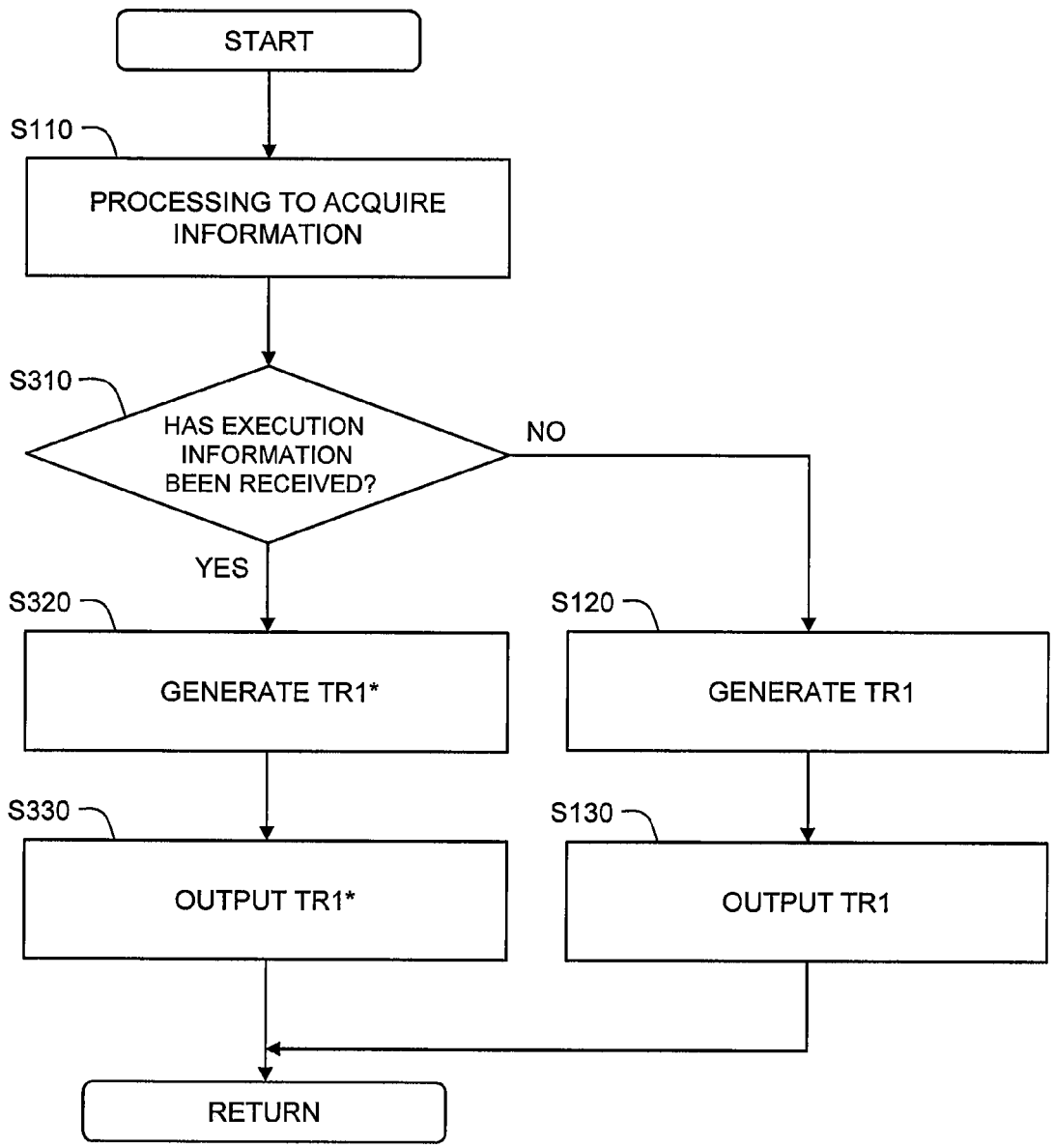
FIG. 20 is a flowchart showing processing executed by the automated driving control device according to the second embodiment.

Hereinafter, the processing when the first control device 120 (the first processor 121) generates the first target trajectory TR1* will be described. FIG. 20 is a flow chart showing the processing executed by the first control device 120. The processing of the steps S110 to S130 is as described in FIG. 11.

Subsequent to the step S110, the first control device 120 judges whether or not the execution information 260 has been received (step S310). If the judgement result of the step S310 is negative, the first control device 120 executes the processing of the steps S120 and S130.

If the judgement result of the step S310 is positive, the first control device 120 generates the first target trajectory TR1* (step S320). The first target trajectory TR1* is generated by modifying the first target trajectory TR1. If the code COD is included in the execution information 260, the first control device 120 modifies the first target trajectory TR1 by referring to the code COD.

Subsequent to the step S320, the first control device 120 outputs the first target trajectory TR1* to the vehicle travel control device 200 via the first input/output interface 130 (step S330). Each time the first target trajectory TR1* is updated, the most recent first target trajectory TR1* is outputted to the vehicle travel control device 200.

Third Embodiment

Figure 21:
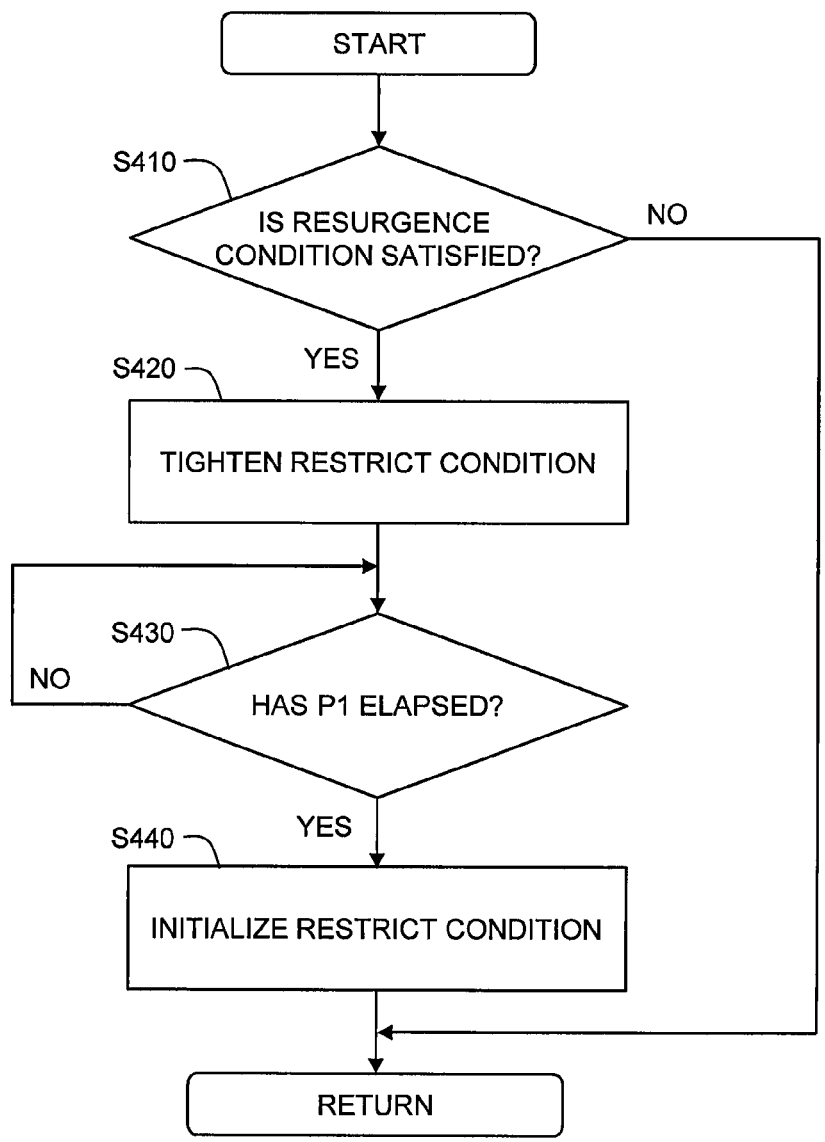
FIG. 21 is a flowchart showing processing executed by the vehicle travel control device according to a third embodiment.

A third embodiment of the present disclosure will be described with reference to FIG. 21. The configuration example of the vehicle control system related to the third embodiment is the same as that of the vehicle control system related to first embodiment. Therefore, the descriptions overlapping with those in the first embodiment are omitted as appropriate.

1. Outline

The vehicle control system according to the third embodiment tighten the restrict condition over the first preset period P1 after it is judged that the resurgence condition is satisfied. "To tighten the restrict condition" means that a threshold of the restrict condition is changed such that the travel of the vehicle 1 based on the first target trajectory TR1 is more likely to conflict with the restrict condition. The threshold of the restrict condition is changed in accordance with the restrict condition that has been judged to be in conflict. In the conflict event of the restrict condition on the Y-direction distance DY, the threshold TH1 is changed to a threshold TH1* having shorter distance than the threshold TH1. In the conflict event of the restrict condition on the Time to collision TTC, the threshold TH2 is changed to a threshold TH2* having shorter time than the threshold TH2. In the conflict event of the restrict condition on the distance DL, the threshold TH3 is changed to a threshold TH3* having a shorter distance than the threshold TH3.

The first preset period P1 may be a fixed duration or may be changed in accordance with the speed of the vehicle 1 when the resurgence condition has been satisfied. In the latter instance, the first preset period P1 is changed so as to become longer as the speed of the vehicle 1 increases. As described above, the vehicle travel control is executed after it is judged that the resurgence condition is satisfied. However, immediately after the resurgence to the vehicle travel control, the avoidance target may show a behavior that could not be predicted before the establishment of the resurgence condition. Immediately after the resurgence to the vehicle travel control, another avoidance target may protrude from a blind spot of the avoidance target. Therefore, it is desirable that more attention be paid to the driving safety immediately after the establishment of the resurgence condition. In this respect, by tightening the restrict condition over the first preset period P1, it is possible to secure the driving safety after the establishment of the resurgence condition.

The counting of the first preset period P1 is started when it is judged that the resurgence condition is satisfied. However, it is assumed that the resurgence condition is judged to be satisfied immediately after it is judged that the travel of the vehicle 1 based on the first target trajectory TR1 conflicts with the restrict condition. Considering such a case, the counting of the first preset period P1 may be started from a timing at which it is judged that there is a conflict with the restrict condition. In this case, if it is judged that the resurgence condition is not satisfied within the first preset period P1, the counting of the first preset period P1 is restarted from a timing at which it is judged that the resurgence condition is satisfied.

2. Vehicle Travel Control Device 200

Hereinafter, the processing when the second control device 220 (the second processor 221) changes the restrict condition will be described. FIG. 21 is a flow chart showing the processing executed by the second control device 220. The processing flow shown in FIG. 21 is repeatedly executed at regular intervals.

The second control device 220 first judges whether or not the resurgence condition is satisfied (step S410). The processing of the step S410 is the same as that of the step S260 shown in FIG. 14. If the judgement result of the step S410 is negative, the second control device 220 ends the processing shown in FIG. 21.

If the judgement result of the step S410 is positive, the second control device 220 tightens the restrict condition (step S420). The second control device 220 changes, based on the restriction condition with which the first target trajectory TR1 conflicted, the threshold of the restrict condition to more strict one. If the restrict condition with which the first target trajectory TR1 conflict is that on the Y-direction distance DY, the threshold TH1 is changed to the threshold TH1*. If the restrict condition with which the first target trajectory TR1 conflict is that on the Time to collision TTC, the threshold TH2 is changed to the threshold TH2*. If the restrict condition with which the first target trajectory TR1 conflicts is that on the distance DL, the threshold TH3 is changed to the threshold TH3*.

Subsequent to the step S420, the second control device 220 judges whether or not the first preset period P1 has elapsed (step S430). The first preset period P1 may be a fixed duration or may be changed according to the vehicle speed at the timing when it is judged that the resurgence condition has been satisfied.

If the judgement result of the step S430 is negative, the second control device 220 executes the processing of the step S430 again. That is, the processing of the step S430 is repeatedly executed until a positive judgement result is obtained. If the positive judgement result is obtained, the second control device 220 initializes the restrict condition (step S440). When the restrict condition is initialized, the threshold of the restrict condition is changed to a default one.

Fourth Embodiment

Figure 22:
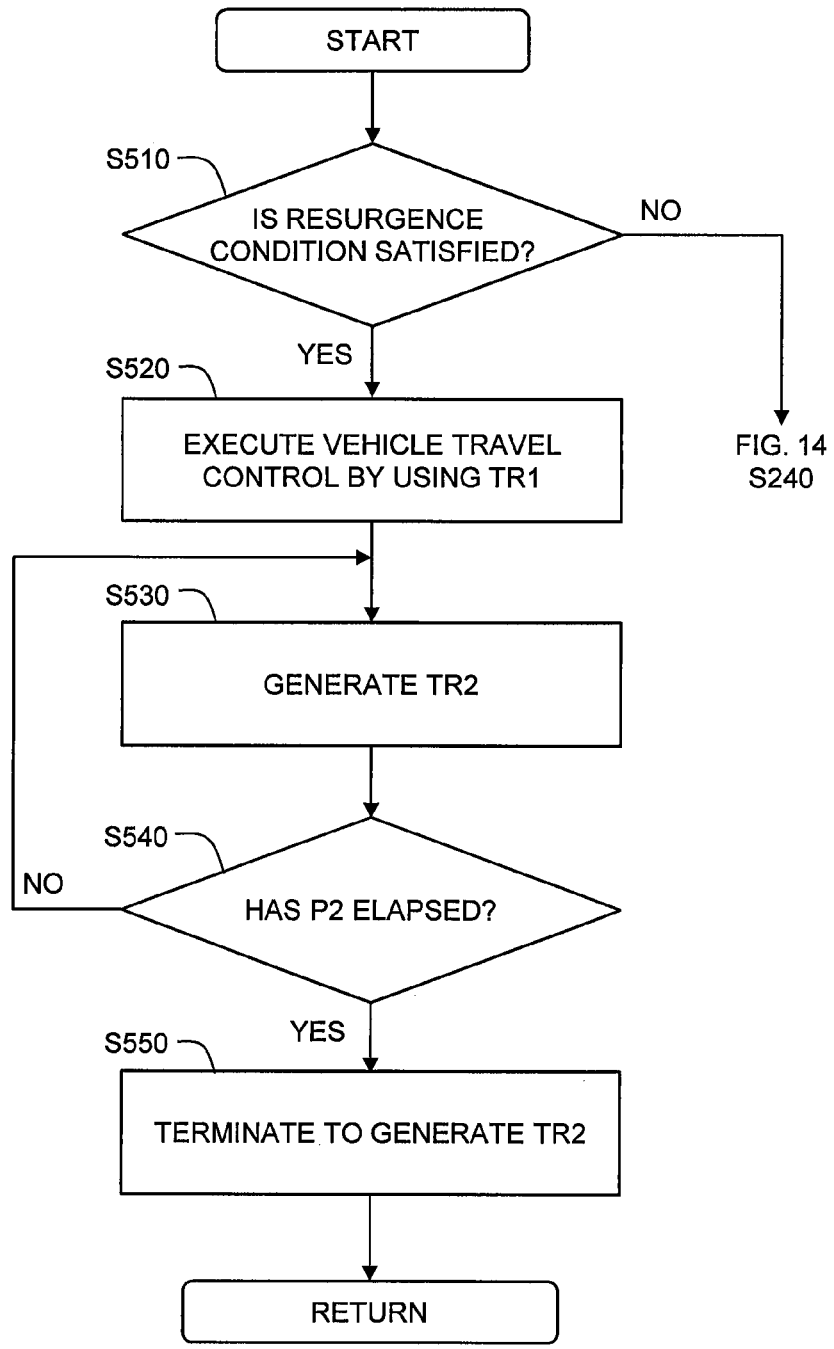
FIG. 22 is a flowchart showing processing executed by the vehicle travel control device according to a fourth embodiment.

A fourth embodiment of the present disclosure will be described with reference to FIG. 22. The configuration example of the vehicle control system related to the fourth embodiment is the same as that of the vehicle control system related to the first embodiment. Therefore, the descriptions overlapping with those in the first embodiment are omitted as appropriate.

1. Outline

The vehicle control system according to the fourth embodiment continuously generates the second target trajectory TR2 over the second preset period P2 after the establishment of the resurgence condition. The vehicle control system according to the first embodiment terminated to generate the second target trajectory TR2 if it is judged that the resurgence condition is satisfied. However, as described in the outline of the third embodiment, immediately after the resurgence to the vehicle travel control, another avoidance target may protrude from the blind spot of the avoidance target. If another avoidance target is recognized, the travel assist control is likely to be re-executed. In this regard, according to the vehicle control system of fourth embodiment, the second target trajectory TR2 is continuously generated over the second preset period P2. Therefore, it is possible to shorten the time from when it is judged that travel of the vehicle 1 based on the first target trajectory TR1 conflicts with the restrict condition until the execution of the travel assist control is restarted.

The second preset period P2 may be a fixed duration or may be changed in accordance with the speed of the vehicle 1 when the resurgence condition has been established. In the latter instance, second preset period P2 is changed so as to become longer as the speed of the vehicle 1 increases. The counting of the second preset period P2 is started from a timing when it is judged that the resurgence condition is satisfied. However, the counting of the second preset period P2 may be started from a timing when it is judged that the travel of the vehicle 1 based on the first target trajectory TR1 conflicts with the restrict condition. This is the same reason as described in the counting start timing of the first preset period P1.

In the second preset period P2, the second target trajectory TR2 is generated focusing on the same avoidance target (or the compartment line) as that before the establishment of the resurgence condition. In this instance, the second target trajectory TR2 is generated based on the restrict condition with which the first target trajectory TR1 conflicted prior to the establishment of the resurgence condition. When a jumping out of another avoidance target is considered, the second target trajectory TR2 is generated by separately setting a virtual avoidance target.

2. Vehicle Travel Control Device 200

Hereinafter, the processing executed when the second control device 220 (the second processor 221) continues to generate the second target trajectory TR2 will be described. FIG. 22 is a flow chart showing the processing executed by the second control device 220. The processing flow shown in FIG. 22 is executed in place of the processing of the steps S260 and S270 shown in FIG. 14. That is, in the vehicle control system according to the fourth embodiment, the processing of the steps S210 to S250 shown in FIG. 14 and the processing of the steps S510 to S550 described below are executed.

The second control device 220 first judges whether or not the resurgence condition is satisfied (step S510). The processing of step S510 is the same as that of the step S260 shown in FIG. 14. If the judgement result of the step S510 is negative, the second control device 220 returns to the processing of the step S240 shown in FIG. 14.

If the judgement result of the step S510 is positive, the second control device 220 executes the vehicle travel control by using the first target trajectory TR1 (step S520). The second control device 220 in addition generates the second target trajectory TR2 (step S530). The processing of the steps S520 and S530 is the same as that of the steps S230 and S240 shown in FIG. 14. The processing of the step S530 may be executed prior to that of the step S520.

Subsequent to the step S530, the second control device 220 judges whether or not the second preset period P2 has elapsed (step S540). The second preset period P2 may be a fixed duration or may be changed in accordance with the vehicle speed at the timing when it is judged that the resurgence condition has been satisfied.

If the judgement result of the step S540 is negative, the second control device 220 returns to the processing of the step S530. Otherwise, the second control device 220 terminates the generation of the second target trajectory TR2 (step S550).

Fifth Embodiment

Figure 23:
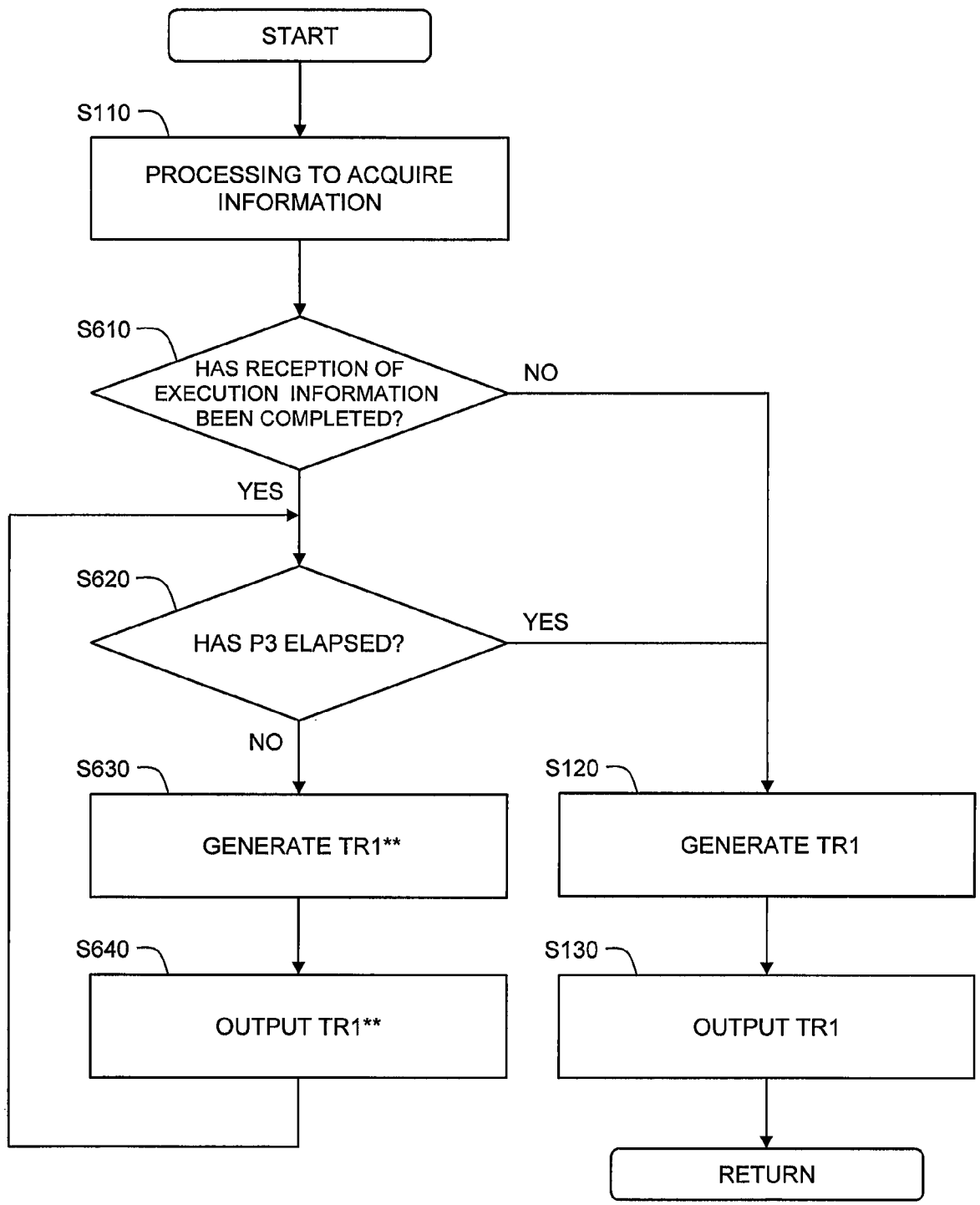
FIG. 23 is a flowchart showing processing executed by the vehicle travel control device according to a fifth embodiment.

A fifth embodiment of the present disclosure will be described with reference to FIG. 23. The configuration example of the vehicle control system related to the fifth embodiment is the same as that of the vehicle control system related to the second embodiment. Therefore, the descriptions overlapping with those in the second embodiment are omitted as appropriate.

1. Outline

The vehicle control system according to the fifth embodiment corrects the first target trajectory TR1 over the third preset period P3 after the establishment of the resurgence condition. In the vehicle control system according to the second embodiment, the first target trajectory TR1 was corrected from the time when it was judged that the travel of the vehicle 1 based on the first target trajectory TR1 conflicted with the restrict condition until it was judged that resurgence condition was satisfied. In the vehicle control system according to the fifth embodiment, the correction method is continuously executed for the third preset period P3 after it is judged that the resurgence condition is satisfied. The first target trajectory TR1 corrected after the establishment of the resurgence condition is hereinafter referred to as a "first target trajectory TR1**".

If the first target trajectory TR1 is generated, the vehicle travel control device 200 judges whether or not the travel of the vehicle 1 based on the first target trajectory TR1 conflicts with the restrict condition. Here, since the first target trajectory TR1 is generated according to the same method as the correction method in the second embodiment, the travel safety level SL is higher than that of the first target trajectory TR1. Therefore, if the first target trajectory TR1 is generated, it is more likely to be judged that the travel of the vehicle 1 based on the first target trajectory TR1** does not conflict with the restrict condition. Therefore, according to the vehicle control system of the fifth embodiment, it is possible to reduce processing load of the processor for generating the second target trajectory TR2.

The third preset period P3 may be a fixed duration or may be changed in accordance with the speed of the vehicle 1 when the resurgence condition has been established. In the latter instance, third preset period P3 is changed so as to become longer as the vehicle speed increases. The counting of the third preset period P3 is started from a timing when it is judged that the resurgence condition is satisfied. However, the counting of the third preset period P3 may be started from a timing when it is judged that the travel of the vehicle 1 based on the first target trajectory TR1 conflicts with the restrict condition. This is the same reason as described in the counting start timing of the first preset period P1.

Since the judgement of the resurgence condition is executed by the vehicle travel control device 200, the automated driving control device 100 cannot directly grasp establishment information on this resurgence condition. Therefore, when the reception of the execution information is completed, the automated driving control device 100 indirectly judges that the resurgence condition is satisfied. If it is judged that the resurgence condition is satisfied, the vehicle travel control device 200 may transmit the establishment information to the automated driving control device 100.

2. Automated Driving Control Device 100

Hereinafter, the processing executed when the first control device 120 (the first processor 121) generates the first target trajectory TR1 will be described. FIG. 23 is a flow chart showing the processing executed by the first control device 120. The processing of the steps S110 to S130 is as described in FIG. 11**.

Subsequent to the step S110, the first control device 120 judges whether or not the reception of the execution information has been completed (step S610). If the judgement result of the step S610 is negative, the first control device 120 executes the processing of the steps S120 and S130.

If the judgement result of step S610 is positive, the first control device 120 judges whether or not the third preset period P3 has elapsed (step S620). If the judgement result of the step S620 is positive, the first control device 120 executes the processing of the steps S120 and S130. Otherwise, the first control device 120 generates the first target trajectory TR1 (step S630). The first target trajectory TR1 is generated by modifying the first target trajectory TR1. The processing of the step S630 is basically the same as that of the step S320 shown in FIG. 20.

Subsequent to the step S630, the first control device 120 outputs the first target trajectory TR1 to the vehicle travel control device 200 via the first input/output interface 130 (step S640). Each time first target trajectory TR1 is updated, the most recent first target trajectory TR1 is outputted to the vehicle travel control device 200**.

What is claimed is:

1. A vehicle control system that controls a vehicle in which an automated driving is performed, the vehicle control system comprising:
a control device including a processor and a storage device that stores a program executable by the processor, wherein when the program is executed by the processor, the processor is configured to:
generate a first target trajectory that is a target trajectory for the automated driving;
execute vehicle travel control based on the first target trajectory;
during the execution of the vehicle travel control, judge whether or not a vehicle travel based on the first target trajectory conflicts with a safety restrict condition;
if it is judged that the vehicle travel based on the first target trajectory conflicts with the restrict condition, generate a second target trajectory being a target trajectory that does not conflict with the restrict condition;
execute travel assist control based on the second target trajectory instead of the execution of the vehicle travel control;
judge whether or not a resurgence condition is satisfied during the execution of the travel assist control based on the first target trajectory that is generated, the resurgence condition includes a condition that a travel safety level of the first target trajectory is greater than or equal to a predetermined safety level, the travel safety level is based on a time to collision; and
if it is judged that the resurgence condition is satisfied, return to the execution of the vehicle travel control from the execution of the travel assist control.

2. The vehicle control system according to claim 1, wherein when the program is executed by the processor, the processor is further configured to:
judge whether or not execution information of the travel assist control is present; and
if it is judged that the execution information is present, generate as the first target trajectory a target trajectory having a travel safety level higher than the first target trajectory that is generated when it is judged that the execution information is absent.

3. The vehicle control system according to claim 1, wherein when the program is executed by the processor, the processor is further configured to:
tighten the restrict condition for a preset period after it is judged that the resurgence condition is satisfied.

4. The vehicle control system according to claim 1, wherein when the program is executed by the processor, the processor is further configured to:
continuously generate the second target trajectory for a preset period after it is judged that the resurgence condition is satisfied.

5. The vehicle control system according to claim 1, wherein when the program is executed by the processor, the processor is further configured to:
for a preset period after it is judged that the resurgence condition is satisfied, generate as the first target trajectory a target trajectory having a higher travel safety level than the first target trajectory that is generated outside the preset period.

6. The vehicle control system according to claim 1, wherein the control device includes a first control device and a second control device capable of communication with each other, wherein the first control device includes a first processor and a first memory device that stores a first program executable by the first processor, and wherein the second control device includes a second processor and a second memory device that stores a second program executable by the second processor, wherein when the first program is executed by the first processor, the first processor is configure to:
generate the first target trajectory; and
transmit the first target trajectory to the second control device, wherein when the second program is executed by the second processor, the second processor is configured to:
execute the vehicle travel control by using the first target trajectory that is received by the second control device;
if it is judged that the vehicle travel based on the first target trajectory conflicts with the restrict condition, generate the second target trajectory;
execute the travel assist control by using the second target trajectory;
judge whether or not the resurgence condition is satisfied during the execution of the travel assist control based on the first target trajectory that is received by the second control device; and
if it is judged that the resurgence condition is satisfied, return to the execution of the vehicle travel control from the execution of the travel assist control.

7. The vehicle control system according to claim 6, wherein when the second program is executed by the second processor, the second processor is further configured to:
if it is judged that the vehicle travel based on the first target trajectory conflicts with the restrict condition, transmit execution information of the travel assist control to the first control device, wherein when the first program is executed by the first processor, the first processor is further configured to:
judge whether or not the execution information received from the first control device is present; and
if it is judged that the execution information is present, generate as the first target trajectory a target trajectory having a travel safety level higher than that of the first target trajectory generated when it is judged that the execution information is absent.

8. The vehicle control system according to claim 6, wherein when the second program is executed by the second processor, the second processor is further configured to:
   tighten the restrict condition for a preset period after it is judged that the resurgence condition is satisfied.

9. The vehicle control system according to claim 6, wherein when the second program is executed by the second processor, the second processor is further configured to:
   continuously generate the second target trajectory for a preset period after it is judged that the resurgence condition is satisfied.

10. The vehicle control system according to claim 6, wherein when the first program is executed by the first processor, the first processor is further configured to:
   for a preset period after it is judged that the resurgence condition is satisfied, generate as the first target trajectory a target trajectory having a higher travel safety level than the first target trajectory that is generated outside the preset period.

* * * * *